(12) United States Patent
Du et al.

(10) Patent No.: US 10,012,437 B2
(45) Date of Patent: *Jul. 3, 2018

(54) METHOD AND APPARATUS FOR ARGON RECOVERY IN A CRYOGENIC AIR SEPARATION UNIT INTEGRATED WITH A PRESSURE SWING ADSORPTION SYSTEM

(71) Applicants: Hai Du, East Amherst, NY (US); Neil M. Prosser, Lockport, NY (US); Yang Luo, Amherst, NY (US); Neil A. Stephenson, East Amherst, NY (US)

(72) Inventors: Hai Du, East Amherst, NY (US); Neil M. Prosser, Lockport, NY (US); Yang Luo, Amherst, NY (US); Neil A. Stephenson, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/057,152

(22) Filed: Mar. 1, 2016

(65) Prior Publication Data
US 2017/0030639 A1 Feb. 2, 2017

Related U.S. Application Data

(60) Provisional application No. 62/199,469, filed on Jul. 31, 2015.

(51) Int. Cl.
*F25J 3/04* (2006.01)
*B01D 53/047* (2006.01)
*C01B 23/00* (2006.01)

(52) U.S. Cl.
CPC ........ *F25J 3/04412* (2013.01); *B01D 53/047* (2013.01); *C01B 23/0036* (2013.01);
(Continued)

(58) Field of Classification Search
CPC .. F25J 3/00412; F25J 3/04448; F25J 3/04884; F25J 3/04939; F25J 3/04042;
(Continued)

(56) References Cited

U.S. PATENT DOCUMENTS 3,751,934 A 8/1973 Frischbier
3,996,028 A 12/1976 Golovko et al.
(Continued)

FOREIGN PATENT DOCUMENTS

CA 2243389 1/1999
DE 1 272 322 7/1968
(Continued)

OTHER PUBLICATIONS

A. N. Fedorov; "Investigation and improvement of cryogenic adsorption purification of argon from oxygen"; Gas Separation Purification, vol. 9, No. 2, pp. 137-145, XP055121716, ISSN: 0950-4214, DOI: 10.1016/0950-4214(95)93951-F.

*Primary Examiner* — Brian King
(74) *Attorney, Agent, or Firm* — Robert J. Hampsch

(57) ABSTRACT

A method and apparatus for argon recovery in which an impure argon stream is separated from air within a cryogenic air separation unit having a divided wall argon rejection/rectification column. The resulting argon stream is subsequently recovered and purified within an integrated pressure swing adsorption system to produce product grade argon.

35 Claims, 10 Drawing Sheets

(52) U.S. Cl.
CPC ......... *F25J 3/0409* (2013.01); *F25J 3/04096* (2013.01); *F25J 3/04103* (2013.01); *F25J 3/04296* (2013.01); *F25J 3/04303* (2013.01); *F25J 3/04678* (2013.01); *F25J 3/04733* (2013.01); *F25J 3/04739* (2013.01); *F25J 3/04884* (2013.01); *F25J 3/04939* (2013.01); *B01D 2256/18* (2013.01); *B01D 2257/102* (2013.01); *B01D 2257/104* (2013.01); *C01B 2210/0034* (2013.01); *C01B 2210/0045* (2013.01); *C01B 2210/0048* (2013.01); *F25J 2205/02* (2013.01); *F25J 2205/60* (2013.01); *F25J 2245/58* (2013.01); *F25J 2250/02* (2013.01); *F25J 2270/02* (2013.01); *F25J 2290/34* (2013.01)

(58) Field of Classification Search
CPC .. F25J 3/04072; F25J 2205/02; F25J 2205/60; F25J 2245/58; F25J 2250/02
See application file for complete search history.

(56) References Cited

U.S. PATENT DOCUMENTS

| | | | |
|---|---|---|---|
| 4,477,265 A | 10/1984 | Kumar et al. | |
| 4,717,406 A | 1/1988 | Giacobbe | |
| 4,734,199 A | 3/1988 | Nagji et al. | |
| 5,114,445 A | 5/1992 | Burton et al. | |
| 5,159,816 A | 11/1992 | Kovak et al. | |
| 5,174,979 A | 12/1992 | Chao et al. | |
| 5,601,634 A | 2/1997 | Jain et al. | |
| 5,685,172 A | 11/1997 | Darredeau et al. | |
| 5,707,425 A | 1/1998 | D'Amico et al. | |
| 5,730,003 A * | 3/1998 | Nguyen | B01D 53/047 62/648 |
| 5,784,898 A | 7/1998 | Gary | |
| 5,868,199 A | 2/1999 | Lavin | |
| 6,023,945 A | 2/2000 | Wong et al. | |
| 6,083,301 A | 7/2000 | Gary et al. | |
| 6,240,744 B1 * | 6/2001 | Agrawal | B01D 3/14 62/643 |
| 6,250,106 B1 | 6/2001 | Agrawal | |
| 6,251,499 B1 | 6/2001 | Lehman et al. | |
| 6,286,336 B1 | 9/2001 | Prosser | |
| 6,351,971 B1 * | 3/2002 | Nguyen | B01D 53/04 62/648 |
| 6,572,838 B1 | 6/2003 | Sebastian et al. | |
| 7,234,691 B2 | 6/2007 | Kovak | |
| 7,294,172 B2 | 11/2007 | Baksh et al. | |
| 7,452,407 B2 | 11/2008 | Golden et al. | |
| 7,501,009 B2 * | 3/2009 | Graham | B01D 53/047 203/41 |
| 8,480,860 B2 | 7/2013 | Kovak | |
| 8,695,377 B2 * | 4/2014 | Bachelier | F25J 3/0409 62/643 |
| 2007/0038333 A1 | 2/2007 | Dadebo et al. | |
| 2007/0209508 A1 | 9/2007 | Graham et al. | |
| 2010/0242538 A1 | 9/2010 | Prosser et al. | |
| 2011/0138856 A1 | 6/2011 | Howard et al. | |
| 2012/0141868 A1 | 6/2012 | Hirano | |
| 2013/0233016 A1 | 9/2013 | Wilson et al. | |
| 2013/0313103 A1 | 11/2013 | Billingham et al. | |
| 2014/0245781 A1 | 9/2014 | Kechagia et al. | |
| 2014/0245782 A1 | 9/2014 | Howard et al. | |
| 2014/0249023 A1 | 9/2014 | Barrett et al. | |

FOREIGN PATENT DOCUMENTS

| | | |
|---|---|---|
| DE | 10 2007 035619 | 2/2009 |
| EP | 0 514 163 A2 | 11/1992 |
| EP | 0 893 156 A2 | 1/1999 |
| EP | 1 291 067 A2 | 3/2003 |
| WO | WO 03/011434 A1 | 2/2003 |
| WO | WO 2011/024687 A1 | 3/2011 |

* cited by examiner

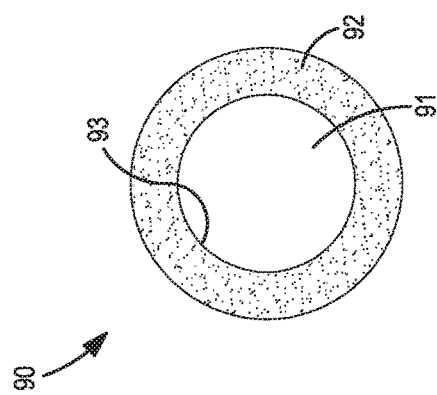
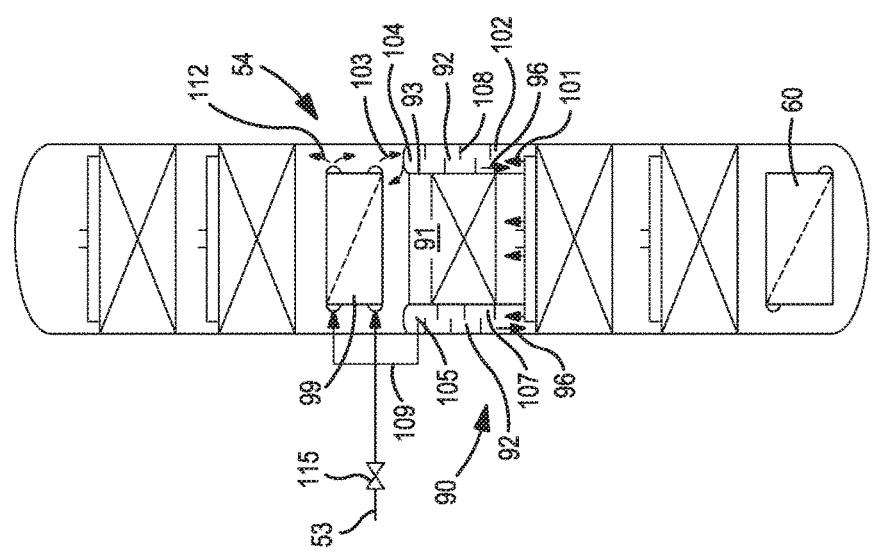

METHOD AND APPARATUS FOR ARGON RECOVERY IN A CRYOGENIC AIR SEPARATION UNIT INTEGRATED WITH A PRESSURE SWING ADSORPTION SYSTEM

CROSS REFERENCE TO RELATED APPLICATIONS

The present application is claims the benefit of and priority to U.S. provisional patent application Ser. No. 62/199,469 filed on Jul. 31, 2015, the disclosure of which is incorporated by reference herein.

TECHNICAL FIELD

The present invention is related to a method and apparatus for argon recovery in which argon is separated from air within a cryogenic air separation plant having a divided wall argon rejection column and condensed using an argon condenser disposed internally within the lower pressure column to form a liquid and/or gaseous argon stream. The liquid or gaseous argon stream is subsequently recovered and purified within an integrated adsorbent based argon refining and purification subsystem to produce product grade argon.

BACKGROUND

Argon is a highly inert element used in the some high-temperature industrial processes, such as steel-making. Argon is also used in various types of metal fabrication processes such as arc welding as well as in the electronics industry, for example in silicon crystals growing processes. Still other uses of argon include medical, scientific, preservation and lighting applications.

While argon constitutes only a minor portion of ambient air (i.e. 0.93% by volume), it possesses a relatively high value compared to the oxygen and nitrogen products that are also recovered from air separation plants. Argon is typically recovered in a Linde-type double column cryogenic air separation arrangement by extracting an argon rich vapor draw from the lower pressure column and directing the stream to a "superstaged" column or crude argon column to recover the argon. This argon distillation process typically includes an argon condensing unit situated above the argon column. The argon condensation load is typically imparted to at least a portion of the oxygen rich column bottoms or kettle stream prior to its introduction into the lower pressure distillation column. Argon can be produced directly by this "superstaged" distillation process to merchant liquid purities (e.g. about 1000 ppm to 1 ppm oxygen) in roughly 90 to 180 stages of separation or produced to intermediary purities (e.g. about 15% to 1% oxygen) in roughly 20 to 50 stages of separation. In some applications, the intermediate purity argon is then often subsequently refined by catalytic oxidation process employing hydrogen.

Modern air separation plants almost exclusively employ a superstaged distillation process for high purity argon recovery. Drawbacks of the typical three column argon producing air separation unit are the additional capital costs associated with argon recovery and the resulting column and coldbox heights, often in excess of 200 feet, are required to recover the high purity argon product. As a consequence, considerable capital expense is incurred to attain the high purity argon, including capital expense for the separate argon columns, multiple coldbox sections, liquid reflux/return pumps, etc.

An alternative method of producing high purity argon is to take a lower purity argon-containing stream from an air separation plant and purify the argon-containing stream using an adsorbent based purification system. There have been combinations of cryogenic air separation units and adsorbent based purification systems with the objective to remove oxygen, nitrogen and other contaminants from the argon-containing streams. See, for example U.S. Pat. Nos. 4,717,406; 5,685,172; 7,501,009; and 5,601,634; each of which are briefly described in the paragraphs that follow.

U.S. Pat. No. 4,717,406 discloses a liquid phase adsorption process wherein a feed stream from a cryogenic plant is directed to an adsorption based purification system. The adsorption based purification system serves to purify the liquefied gas prior to introducing it into a liquid storage tank. The targeted applications include the removal of water and carbon dioxide from electronics grade gases and the disclosed regeneration method of the adsorbent beds is a temperature swing process.

U.S. Pat. No. 5,685,172 details a process targeting the removal of trace oxygen and carbon monoxide from a variety of inert gases. The process also notes direct liquid processing and argon is cited as an example fluid. Metal oxides (CuO, MnO2) are detailed as adsorbents for oxygen. Regeneration is accomplished through the use of a reducing gas such as hydrogen at modest temperatures (e.g., 150° C. to 250° C.). The use of a reducing gas makes it difficult to integrate the adsorbent beds with the air separation units because the reducing gas is not made in the air separation unit and but must be externally supplied to regenerate the adsorbents. More importantly, during regeneration of the adsorbent beds, argon rich fluids will be lost from the process.

U.S. Pat. No. 7,501,009 discloses a cyclic adsorption process for the purification of argon. The process may be operated at cryogenic temperature while processing crude argon in the gaseous state. Zeolites are noted as possible adsorbents for the disclosed pressure swing adsorption (PSA) system. Regeneration gas is directed back to the argon-oxygen rectification column.

U.S. Pat. No. 5,601,634 combines a typical cryogenic air separation unit and pressure swing adsorption (PSA) system in which both nitrogen and oxygen contained in the argon feed from the distillation column of the cryogenic air separation unit are removed in adsorbent beds.

All of the above-identified prior art solutions focus only on improvements in the adsorbent based purification system of the combined cryogenic air separation unit and adsorption based purification arrangement and do not address improvements needed to the cryogenic air separation unit, including the use of a divided wall argon rejection column and argon condenser disposed internally within the lower pressure column, as contemplated in the present solution.

The use of divided wall columns within the prior art literature is clear, including some prior art references that teach the use of divided wall columns for argon rejection. See, for example, U.S. Pat. Nos. 8,480,860; 7,234,691; 6,250,106; 6,240,744; and 6,023,945. In addition, U.S. Pat. No. 5,114,445 teaches an improvement to the recovery of argon through the placement of an argon condenser within the lower pressure column as part of a means to thermally link the top of the crude argon column with the lower pressure column and which teaches that the most suitable location for the argon condenser is as an intermediate location within the lower pressure column, particularly, the section of the lower pressure column bounded by the feed point of the crude liquid oxygen bottoms from the higher pressure column and the vapor feed draw line for the crude argon column.

Each of the above-identified prior art methods and systems, make incremental improvements to the operating efficiency of cryogenic air separation plants, and in some cases to the recovery of argon. However, each of the prior art references have notable short-comings or design challenges that drive increased capital costs, plant configuration, and/or argon recovery inefficiencies. As a result, there is a continuing need to develop further improvements to existing argon rejection and recovery processes or arrangements that are fully integrated with the distillation column and cycles of cryogenic air separation units. In particular, for some cryogenic air separation units there is a need to design an argon rejection and recovery process within the air separation cycles that is flexible in that it avoids or defers some of the up-front capital costs associated with argon recovery but allows argon recovery to be easily added to the cryogenic air separation unit at a later date when the argon production requirements change.

SUMMARY OF THE INVENTION

The present invention may be characterized as a method of producing a purified liquid argon product in a cryogenic air separation unit integrated with a pressure swing adsorption system, the method comprising the steps of: (i) separating argon from an oxygen-argon containing stream within a lower pressure column of the cryogenic air separation unit using an argon rectification column arrangement disposed within the lower pressure column, the separation of the argon from the oxygen-argon containing stream producing an impure argon stream having between about and 4% and 25% of oxygen impurities; (ii) warming the impure argon stream to a temperature between about 200K and 300K; (iii) pressurizing the impure argon stream to a pressure between 80 psig and 120 psig; (iv) purifying the warm, pressurized, impure argon stream by introducing the warm, pressurized impure argon stream into a pressure swing adsorption system to produce a purified argon stream and a waste gas stream; and (v) condensing and subcooling the argon product stream via indirect heat with a liquid nitrogen stream from the cryogenic air separation unit to produce the purified liquid argon product.

The present invention may also be characterized as an apparatus for producing a purified argon product comprising: (a) a cryogenic air separation unit having a higher pressure column and a lower pressure column, and an argon rectification column arrangement disposed within the lower pressure column, the cryogenic air separation unit configured to produce an impure argon stream having between about and 4% and 25% of oxygen impurities from an oxygen-argon containing stream introduced from the lower pressure column to the argon rectification column arrangement; (b) a heat exchanger configured to warm the impure argon stream to a temperature between about 200K and 300K against a stream of the purified argon product stream and a balancing air stream from an incoming air purification and compression train of the cryogenic air separation unit; (c) an argon compressor configured for pressurizing the impure argon stream to a pressure between about 80 psig and 120 psig; (d) a pressure swing adsorption system configured for purifying the impure argon stream, the pressure swing adsorption system comprising an adsorbent bed having an adsorbent configured for adsorbing the oxygen impurities to produce a purified argon stream and a waste gas stream.

In various embodiments of the present invention, an argon condensing assembly is disposed within the lower pressure column at a location above the argon rectification column arrangement and configured to condense the impure argon stream from the argon rectification column arrangement to an impure liquid argon stream against a sub-cooled bottoms liquid from the higher pressure column. In such embodiments, the down-flowing liquid stream or argon reflux stream in the argon rectification column arrangement comprises a portion of the impure liquid argon stream from the argon condensing assembly. Another portion of the impure liquid argon stream may be diverted from the argon condensing assembly or from a location downstream of the argon condensing assembly to the pressure swing adsorption system. Alternatively, in embodiments where the impure argon stream is in gaseous form the impure gaseous argon stream is generally diverted from an upper location of the argon rectification column arrangement and upstream of the argon condensing assembly.

Embodiments of the present invention may also include recycling the waste gas stream from the pressure swing adsorption system to the argon rectification column arrangement or alternatively recycling the waste gas stream from the pressure swing adsorption system and combining it with the impure argon stream at a location upstream of the pressure swing adsorption system. Also, after warming the impure argon stream the balancing air stream is returned to a location upstream of a lower column turbine system of the cryogenic air separation unit or a location upstream of the higher pressure column.

In various embodiments of the present invention, an argon condensing assembly is disposed within the lower pressure column at a location above the argon rectification column arrangement and configured to condense the impure argon stream from the argon rectification column arrangement to an impure liquid argon stream against a sub-cooled bottoms liquid from the higher pressure column. In such embodiments, the down-flowing liquid stream in the argon rectification column arrangement comprises a portion of the impure liquid argon stream from the argon condensing assembly. Another portion of the impure liquid argon stream may be diverted from the argon condensing assembly or from a location downstream of the argon condensing assembly to the pressure swing adsorption system. Alternatively, in embodiments where the impure argon stream is in gaseous form the impure gaseous argon stream is generally diverted from an upper location of the argon rectification column arrangement and upstream of the argon condensing assembly.

The heat exchanger configured to warm the impure argon stream to a temperature between about 200K and 300K may be the main heat exchanger of the air separation unit where the impure argon stream is warmed against a stream of warm, purified, compressed air or the heat exchanger may be an argon recovery heat exchanger where the impure argon stream is warmed against the purified argon stream or against a stream of purified, compressed air from the incoming air purification and compression train of the cryogenic air separation unit or preferably both warming streams.

BRIEF DESCRIPTION OF THE DRAWINGS

While the specification concludes with claims specifically pointing out the subject matter that Applicant regards as his invention, it is believed that the invention will be better understood when taken in connection with the accompanying drawings in which:

FIGS. 3a and 3b are a partial side sectional view and a top sectional view of the divided wall column arrangement in accordance with another embodiment;

For sake of clarity, the drawings may use like reference numerals for like components shown in the different embodiments of the invention.

DETAILED DESCRIPTION

Figure 1:
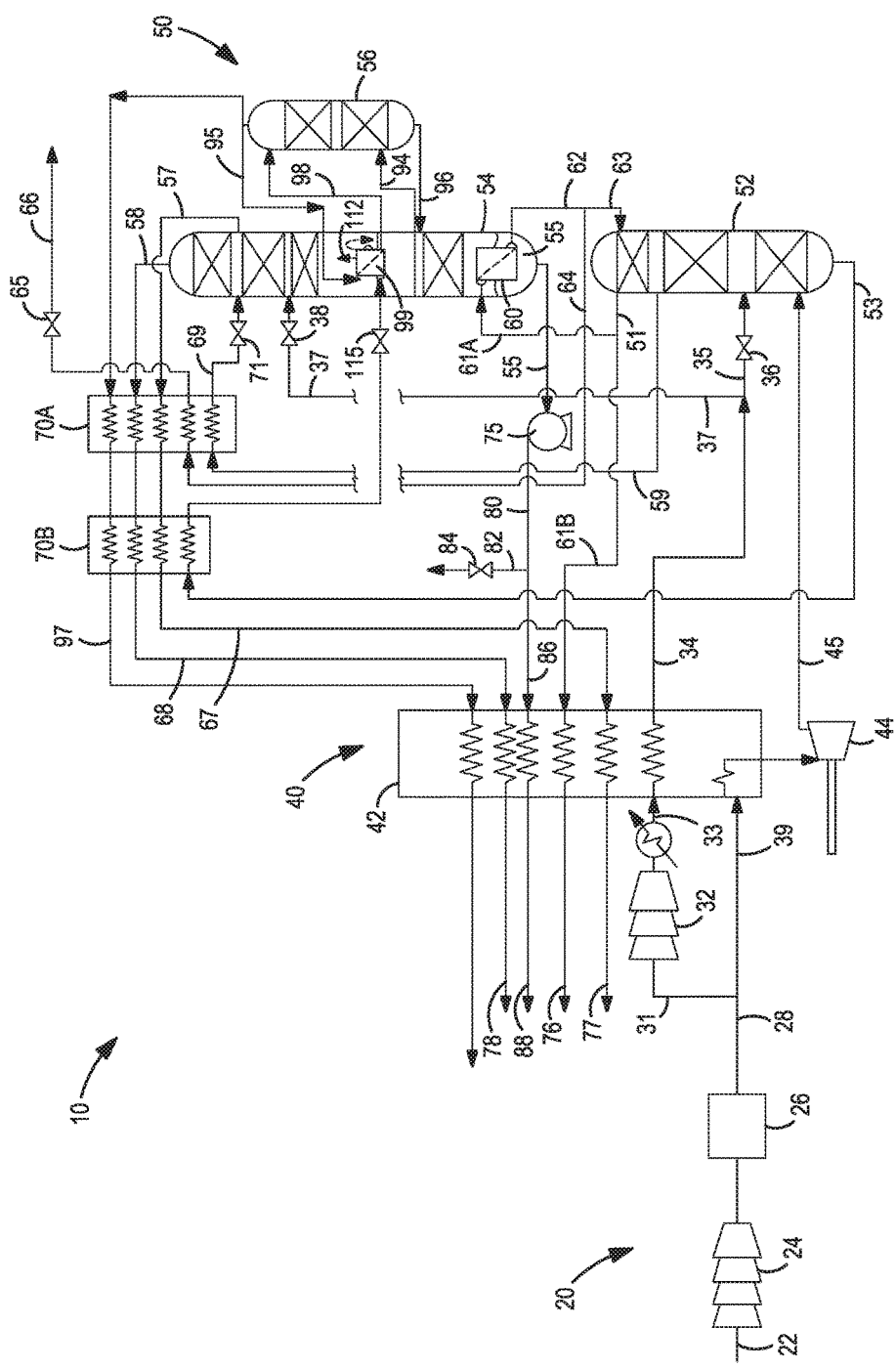
FIG. 1 is a schematic illustration of an embodiment of an air separation plant having an air separation unit incorporating an argon rectification column and argon condensing assembly in accordance with the present invention.
Figure 2:
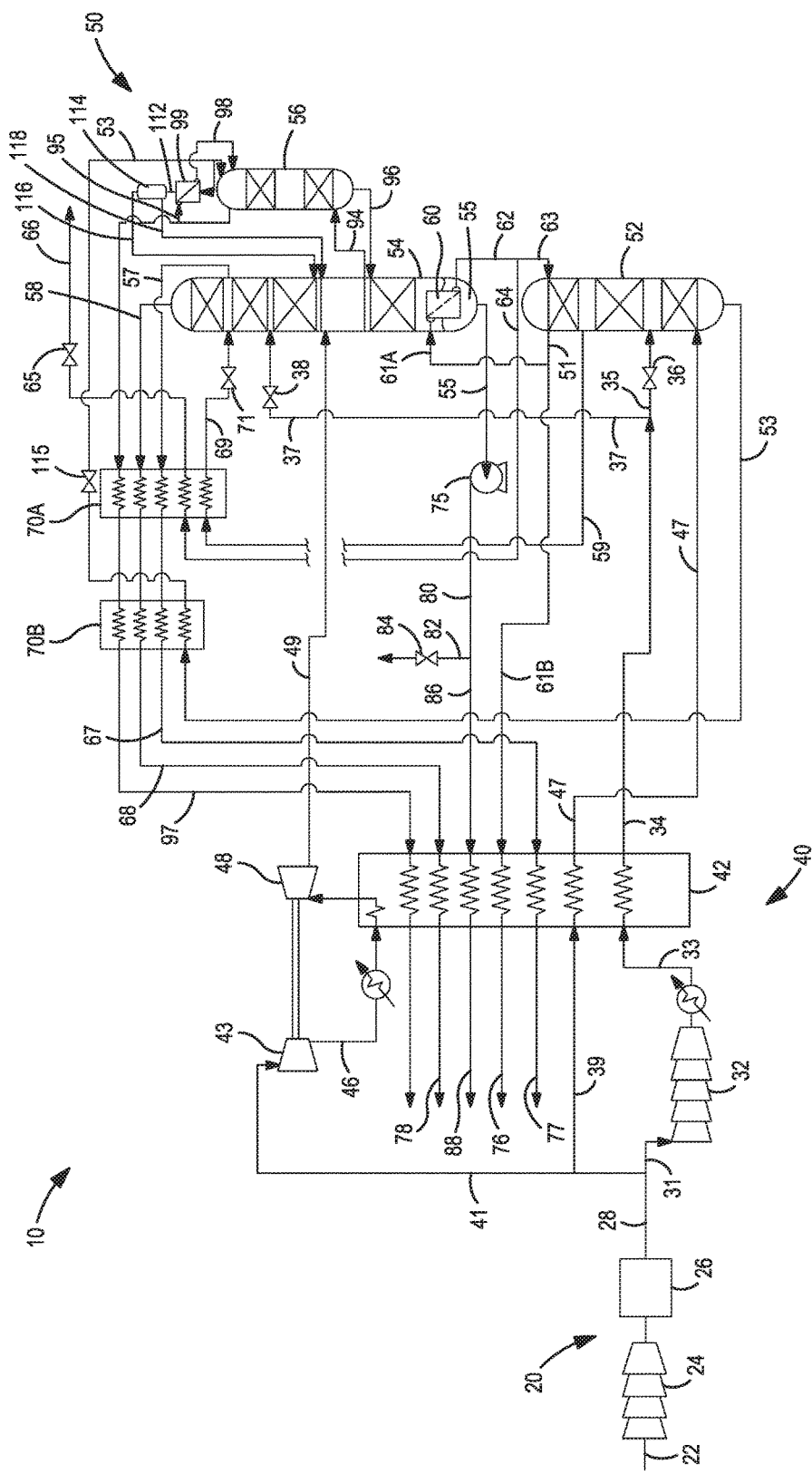
FIG. 2 is a schematic illustration of an alternate embodiment of an air separation plant having an air separation unit incorporating an argon rectification column and argon condensing assembly in accordance with the present invention.
Figure 5:
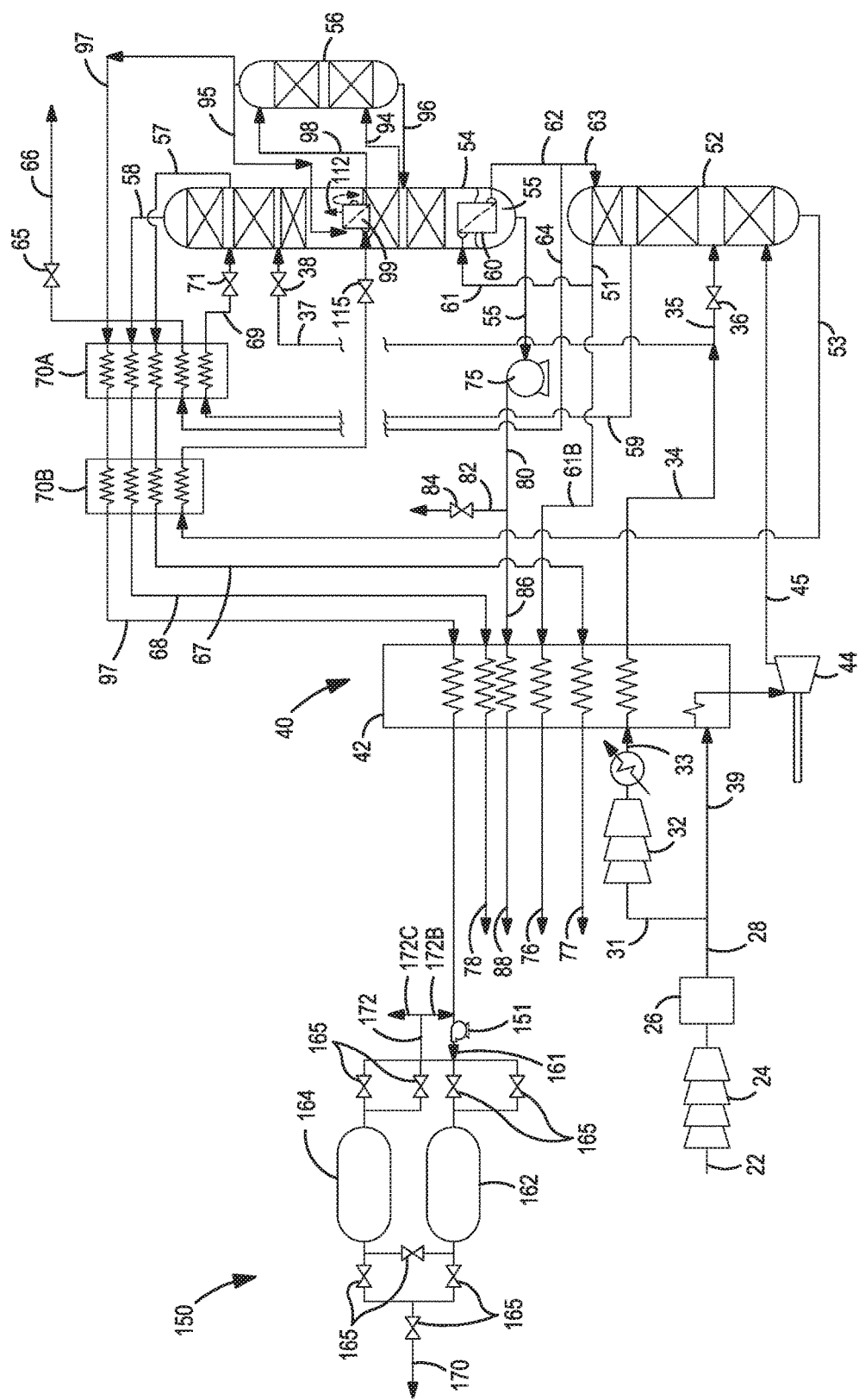
FIG. 5 is a schematic illustration of a further embodiment of an air separation plant having an air separation unit incorporating an argon rectification column and argon condensing assembly and further integrated with an adsorption based argon recovery and purification subsystem.
Figure 6:
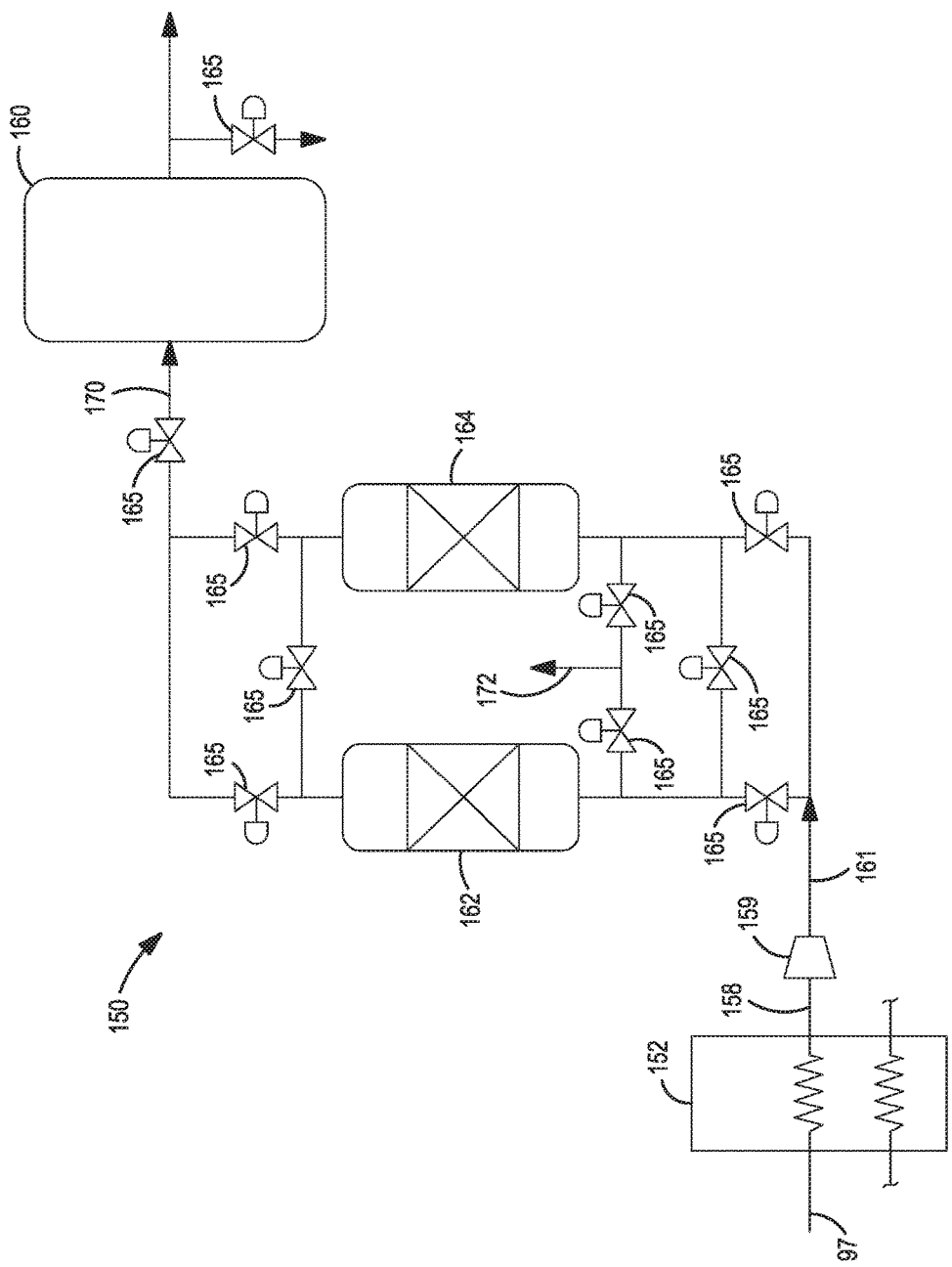
FIG. 6 is a schematic illustration of one embodiment of an adsorption based argon refining and purification subsystem.
Figure 7:
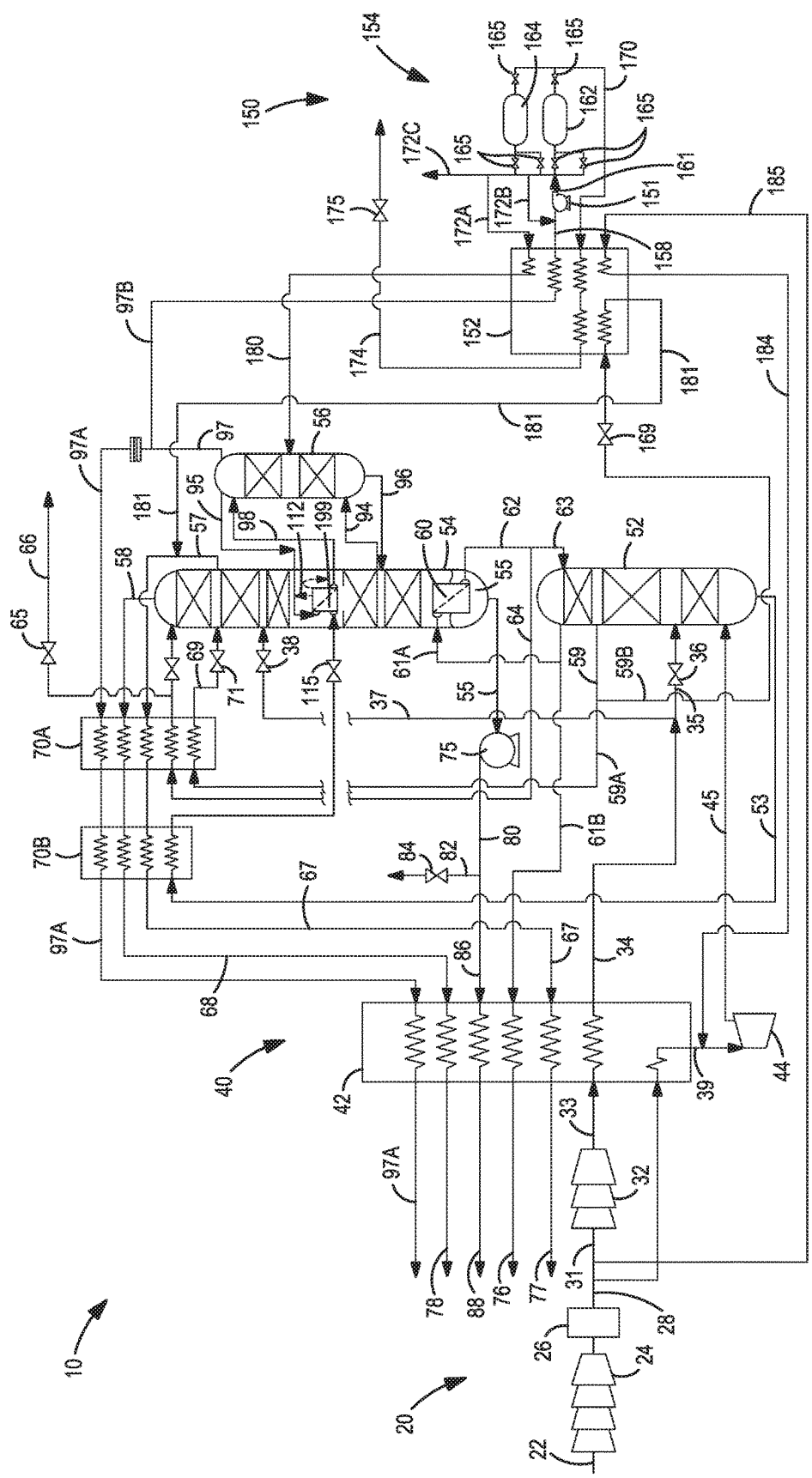
FIG. 7 is a schematic illustration of yet another embodiment of an air separation plant having an air separation unit incorporating an argon rectification column and argon condensing assembly and further integrated with an argon recovery and purification subsystem.

In reference to FIG. 1 and FIG. 2, an air separation plant 10 is illustrated that in a broad sense includes an incoming air purification and compression train or subsystem 20; main heat exchange subsystem 40; and a distillation column subsystem 50. The embodiments of FIG. 1 and FIG. 2 are configured for argon rejection in a manner described in more detail below. Alternatively, as shown in FIGS. 5-7, the air separation plant 10 may further include and an adsorption based argon refining and purification subsystem 150 configured to recover and purify an impure or crude argon-rich stream.

In the incoming air purification and compression train or subsystem 20 shown in FIGS. 1 and 2, the incoming feed air 22 is compressed in a main air compressor 24 and then purified in a pre-purification unit 26 to remove high boiling contaminants from the incoming feed air. Such a pre-purification unit 26 typically has beds of adsorbents to adsorb such contaminants as water vapor, carbon dioxide, and hydrocarbons. As described in more detail below, the compressed and pre-purified feed air stream 28 is separated into oxygen-rich, nitrogen-rich, and argon-rich fractions in a plurality of distillation columns including a higher pressure column 52, a lower pressure column 54, and an argon rectification column 56.

Prior to such distillation however, the compressed, pre-purified feed air stream 28 is cooled to temperatures suitable for rectification within a primary or main heat exchanger 42 using refrigeration from the various oxygen, nitrogen and/or argon streams produced by the air separation plant together with supplemental refrigeration generated as a result of turbo-expansion of various streams in an upper column turbine (UCT) arrangement (shown in FIG. 2), a lower column turbine (LCT) arrangement (shown in FIG. 1), and/or a warm recycle turbine (WRT) arrangement (not shown) as is generally known to those persons skilled in the art. Finally, in the argon refining subsystem 150 of FIGS. 5-7, the argon rich fraction that is separated in the argon rectification column may be further purified or refined, as described below, to produce product grade argon.

In the illustrated embodiment of FIG. 1, a first portion 31 of the compressed, pre-purified feed air stream 28, resulting from the compression and pre-purification of the incoming feed air 22 is further compressed in a boosted air compressor 32 and cooled in an aftercooler to form a high pressure air stream 33 that is fed to the main heat exchanger 42. The high pressure air stream 33 forms a liquid phase or a dense fluid if its pressure exceeds the critical pressure after cooling in the main heat exchanger 42. The cooled stream 34 is then split into two portions, with a first portion 35 being directed through an expansion valve 36 and into the higher pressure column 52 and a second portion 37 is expanded through another expansion valve 38 and introduced into the lower pressure column 54. After partial traversal through main heat exchanger 42, a second portion 39 of the compressed, pre-purified feed air stream 28 is expanded through a lower column turbine 44 to generate supplemental refrigeration. The expanded stream 45 exiting the lower column turbine 44 is then directed to the higher pressure column 52.

In the illustrated embodiment of FIG. 2, a portion 39 of the compressed, pre-purified feed air stream, resulting from the compression and pre-purification of the incoming feed air, as described above, is cooled to near saturation within a primary or main heat exchanger 42 and the cooled stream 47 is subsequently directed to the base of the higher pressure column 52. A second portion 41 of the compressed, pre-purified feed air stream is further compressed in a turbine-driven air compressor 43 to form a high pressure air stream 46 that is also fed to the main heat exchanger 42. After partial traversal of main heat exchanger 42, this high pressure air stream 46 is then work expanded through a turbine 48 to a pressure in the range of about 1.1 to 1.5 bar. The resulting low pressure exhaust stream 49 is then introduced into an intermediary location of a lower pressure column 54. Preferably, the turbine 48 is directly linked or coupled to the turbine-boosted air compressor 43, which absorbs the power from the turbine 48. Alternatively, it should be noted that the work of expansion may be employed for other compression service or used to generate electric power. The remainder 31 of the feed air is further compressed in a boosted air compressor 32 to form a high pressure air stream 33 that is fed to the main heat exchanger 42. The high pressure air stream 33 forms a liquid phase or a dense fluid if its pressure exceeds the critical pressure after cooling in the main heat exchanger. In general, the resulting high pressure air stream will exit the main heat exchanger 42 at a temperature in the range of about 93.0 K to 103.0 K.

The high pressure liquid air stream 34 in the embodiment of FIG. 2 is then split into two portions. The first portion 35 is directed through expansion valve 36 and into the higher pressure column 52, which typically operates at a pressure in the range of about 5.0 bar to 6.0 bar. The remaining portion 37 is expanded through valve 38 and introduced into the lower pressure column 54. In general, the high pressure air stream 34 will constitute about 25% to 35% of the total air feed entering the air separation plant 10. In addition about 5% to 15% of the incoming air feed will be expanded in turbine 48.

It should be noted that higher pressure column 52, the lower pressure column 54, and the argon rectification/rejection column 56 represent distillation columns in which vapor and liquid are counter-currently contacted in order to affect a gas/liquid mass-transfer based separation of the respective feed streams. Such columns will preferably employ structured packing or trays.

As shown in FIGS. 1 and 2, within the higher pressure column 52, the expanded liquid air and gaseous air are separated into a nitrogen-rich overhead 51, a nitrogen-rich shelf draw 59 and oxygen-rich bottoms 53 (i.e. kettle liquid). The condensation of a portion of the nitrogen-rich overhead 51 is effected by introducing a portion thereof as nitrogen-rich vapor stream 61A into a main condenser 60. The latent heat of condensation is imparted to the oxygen-rich bottoms 55 of the lower pressure column 54. The resulting nitrogen rich liquid stream 62 is then divided with a portion 63 directed to reflux higher pressure column 52 while the remaining portion 64 may be subcooled and taken as liquid nitrogen product 66 via valve 65. The remaining portion of the nitrogen-rich overhead 61B may be taken via main heat exchanger 42 as a gaseous nitrogen product 76. The nitrogen-rich shelf draw 59 is subcooled in subcooler 70A and the resulting subcooled stream 69 is directed to the lower pressure column 54 via valve 71 as reflux stream.

The oxygen-rich kettle liquid stream 53 composed of the bottoms liquid of the higher pressure column 52, the shelf draw 59, and remaining portion of the liquid nitrogen stream 64 are preferably cooled against warming nitrogen streams 57, 58 derived or taken from lower pressure column 54 within subcooler/heat exchangers 70A, 70B. The warmed nitrogen-rich vapor streams 67, 68 are then directed to the main heat exchanger 42 where it is further warmed to produce a nitrogen product stream 78 and/or nitrogen waste stream 77. Although not shown, a portion of the warmed nitrogen streams often finds use as a purge/sweep fluid for purposes of regenerating the warm end adsorbent systems of the pre-purification unit 26.

Within the lower pressure column 54, the oxygen-rich kettle liquid, liquid air stream, and nitrogen-rich shelf are further separated into a nitrogen-rich overhead stream 58 and into an oxygen-rich bottoms liquid 55, typically of greater than about 99.5% purity. This liquid oxygen stream 55 is extracted from the base of the lower pressure column 54 and then elevated in pressure by a combination of gravitational head and/or mechanical pump 75. A first portion of this pressurized liquid oxygen stream 80 is split into a liquid oxygen product fraction 82 which is directed through valve 84 into suitable storage vessel (not shown). This oxygen may alternatively be withdrawn before the pump. The remaining liquid oxygen fraction 86 is vaporized and warmed within main heat exchanger 42 and emerges as high pressure gaseous oxygen product stream 88 that may be used directly or directed to a distribution pipeline. In many embodiments, the bulk of the high pressure air stream 33 is liquefied for purposes of vaporizing the liquid oxygen 86. The resulting liquid air stream 34 is distributed into the distillation column system 50, as generally described above.

The high pressure air 34 and pumped oxygen 86 can be above their critical pressure. In such cases the liquefaction of the high pressure air 34 and vaporization of the liquid oxygen 86 are not discrete phase changes.

Divided Wall Argon Rectification Column

With reference to FIGS. 1-4 and particularly FIGS. 3a, 3b, 4a and 4b, within the footprint of the lower pressure column structure, an intermediate portion of the column structure preferably contains a divided wall column arrangement 90 having a main distillation section 91 and a partitioned argon rejection section 92. In the illustrated embodiments, the partitioned argon rejection section 92 is configured as an argon rectification column 56 whereas the main distillation section 91 is configured as a portion of the lower pressure distillation column. It has been found that for certain air separation plants, and in particular many gas only oxygen plants, an argon rectification column can enable large power savings. Rejecting argon using an argon rectification column serves to increase oxygen recovery in an air separation plant that is not typically designed to recover argon. As discussed above, in many cases a separate argon rectification column involves high capital costs. This is especially true in larger plants that would require an additional or enlarged cold box package to accommodate the separate argon rectification column.

The additional capital cost typically associated with a separate argon rejection column is greatly reduced if, as contemplated in the present embodiments, the argon rectification column 56 is combined with and disposed within the lower pressure column 54 structure as a divided wall column arrangement 90. It is important to note that when making an argon product in many conventional cryogenic air separation units, a defined section of the lower pressure column is typically under-utilized or unloaded because some of the vapor is "bypassed" to the external crude argon or super-staged' column so that the flow area of this underutilized or unloaded section of the lower pressure column required for distillation can be reduced and somewhat less than the flow area for the remainder of the lower pressure column sections. As a result, an argon rectification column can be co-located in this under-utilized or unloaded section of the lower pressure column structure by designing a divided wall column having a main distillation section and a partitioned argon rejection section at this location of the lower pressure column structure. In such arrangement, a portion of the vapor from the adjacent section of the lower pressure column immediately below the divided wall column flows to the partitioned argon rejection section 92. The remaining portion of the vapor from the adjacent section of the lower pressure column immediately below the divided wall column arrangement 90 flows upward through to the main distillation section 91.

The divided wall argon rectification column disposed within partitioned argon rejection section 92 of the lower pressure column structure operates at a pressure comparable to the pressure within the lower pressure column. The partitioned argon rejection section 92 receives an upward flowing argon and oxygen containing vapor feed 94 from the lower pressure column, typically having a concentration of about 8% to 15% by volume argon, and a down-flowing argon rich reflux 98 received from an argon condensing assembly 99. The partitioned argon rejection section 92 serves to rectify the argon and oxygen containing vapor feed 94 by separating argon from the oxygen into an argon enriched overhead vapor stream 95 and an oxygen-rich liquid stream 96 that that is released or returned into the lower pressure column 54 at a point below the divided wall column arrangement 90. The mass transfer contacting elements within the divided wall argon rectification column arrangement could be trays or other packing. Possible column packing arrangements include structured packing, strip packing, or silicon carbide foam packing.

The resulting argon-rich vapor overhead stream 95 is then preferably directed to the argon condensing assembly 99 or argon condenser also disposed within the structure of the lower pressure column where all or a portion of the argon-rich vapor overhead stream 95 is condensed into a crude liquid argon stream 98. The resulting crude liquid argon stream 98 is used as an argon-rich reflux stream for the partitioned argon rejection section 92 and optionally taken an impure or crude liquid argon stream (not shown). In the depicted embodiments, the argon-rich reflux stream 98 is directed back to the uppermost portion of the partitioned section 92 and initiates the descending argon liquid phase that contacts the ascending argon and oxygen containing vapor feed 94. In some alternate embodiments, a portion of the argon-rich reflux stream 98 may be directed as a crude argon-rich liquid stream 98B to a downstream adsorption based argon refining and purification subsystem 150 in air separation plants having specific argon product requirements. Likewise, a portion of the argon-rich vapor overhead stream 97 may be diverted and directed to the main heat exchanger 42 to recover refrigeration or the portion of the argon-rich vapor overhead stream 97 can be diverted and directed as a crude argon-rich stream 97B to the adsorption based argon refining and purification subsystem 150.

In the illustrated embodiments, the height of the partitioned argon rejection section 92 is preferably limited to accommodate between about 15 and 40 stages of separation, and more preferably between 20 and 30 stages of separation. While such limited number of separation stages is sufficient for argon rectification needed to improve the oxygen recovery of the cryogenic air separation unit, the resulting purity of the argon rectification vapor stream exiting the partitioned argon rejection section 92 is relatively low at about 4% to 25% oxygen, and more preferably between 10% and 15% oxygen, with up to 1% nitrogen impurities.

FIGS. 3a and 3b show a schematic representation of a limited height, annular divided wall argon rectification column, using the outer annular space as the argon rectification column or partitioned argon rejection section 92 and the inner annular space as the main distillation section 91. For a limited height, annular divided wall column, trays or structured packing can be used as mass transfer media in the partitioned section 92 whereas structure packing is the preferred mode of separation in the main distillation section 91. As discussed above, the divided wall argon rectification column is a partitioned section 92 disposed in a juxtaposed orientation with the main distillation section 91 both within an outer shell of the lower pressure column 54. The divided wall argon rectification column is preferably an annular or cylindrical configuration (shown in FIGS. 3a and 3b) but a segmented or planar configuration (shown in FIGS. 4a and 4b) is equally effective. In either configuration, the ratio of the cross sectional area of the main distillation section 91 to the cross sectional area of the partitioned section 92 (i.e. argon rectification column) is between about 0.5:1 and 5:1.

Figure 4B:
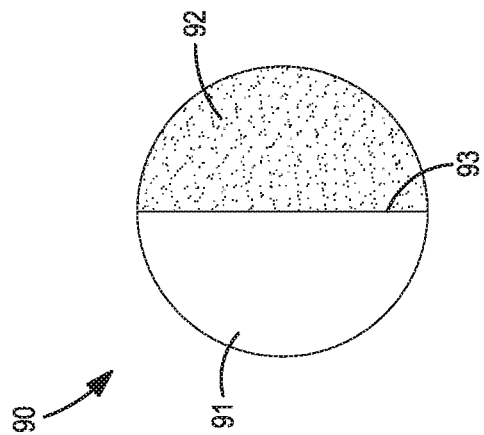
FIGS. 4a and 4b are a partial side sectional view and a top sectional view of an alternate divided wall column arrangement in accordance with another embodiment of the present invention.
Figure 4A:
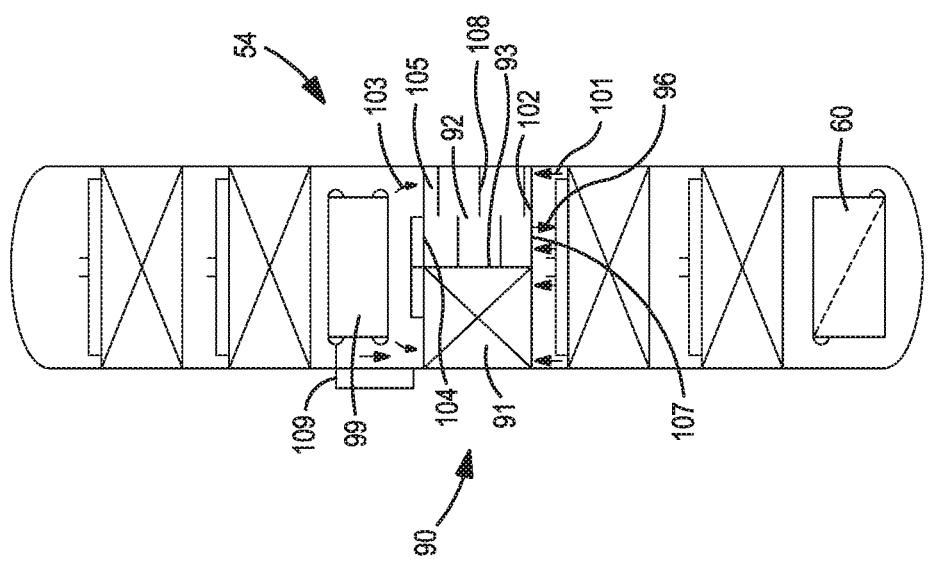

The partitioned section 92 of the divided wall column arrangements of FIGS. 3a and 3b as well as the arrangements in FIGS. 4a and 4b preferably includes a partition wall 93 having a top section, a bottom section, a first surface, a second surface opposite the first surface, and a plurality of mass transfer elements disposed adjacent to the first surface of the partitioned wall forming the argon rectification column. The ascending vapor is an argon-oxygen stream 101 that enters the partitioned argon rejection section 92 via an inlet area 102 disposed proximate the bottom section of the partition wall 93 and is directed to the mass transfer elements such as separation trays 108. A second inlet area 104 disposed proximate the top section of the partition wall is configured to receive a down flowing liquid stream 103 required to facilitate the argon rectification. The divided wall argon rectification column arrangement 90 further includes a first outlet area 105 disposed proximate the top section of the partition wall 93 for withdrawing an ascending argon-rich overhead vapor 95 and a second outlet area 107 disposed proximate the bottom section of the partition wall 93 for withdrawing the descending oxygen rich liquid stream 96 and releasing the descending oxygen rich liquid stream 96 into the lower distillation sections of the lower pressure column 54.

Similarly, the main distillation section 91 of the illustrated divided wall column arrangements include a plurality of mass transfer elements configured continue the air separation occurring within the lower pressure column. In the preferred annular divided wall configuration of FIGS. 3a and 3b, the annular argon region surrounds and is concentric with the annular oxygen-nitrogen region whereas in the planar divided wall 93 configuration of FIGS. 4a and 4b, the partitioned section 92 and the main distillation section 91 are disposed in a side by side arrangement divided by the partition wall 93.

As described in more detail below, the argon condensing assembly 99 is preferably configured as a once-through argon condenser and is disposed internal to the lower pressure column 54, just above the divided wall arrangement 90 of the lower pressure column structure that forms the argon rectification column. This location of the argon condensing assembly 99 or argon condenser is the natural feed point for the kettle liquid and vapor, and the natural point to condense the argon overhead vapor 95. As a result, this location is an ideal location to house the argon condenser 99 to minimizing piping and avoiding the need for a separator vessel for the two phase partially boiled kettle stream. Alternatively, the argon condenser 99 may be disposed at the uppermost portion of lower pressure column 54, although additional piping may be required.

Internal Argon Condenser

The illustrated embodiments provide an improved method and arrangement for argon recovery from a cryogenic air separation unit configured with a higher pressure column 52, a lower pressure column 54 and a divided wall argon rectification column 56. As seen therein, the improved method and arrangement for argon recovery comprises condensing the argon-rich, overhead vapor 95 from the top of the divided wall argon rectification column in an argon condensing assembly 99 disposed at an intermediate location within the lower pressure column 54. In the preferred embodiment, the argon-rich overhead vapor 95 is directed to the argon condenser 99 via line 109 and is condensed in the argon condensing assembly 99 via indirect heat exchange with the entire kettle liquid stream 53 fed from the higher pressure column 52 and subcooled in subcooler 70B. Control of this flow is preferably accomplished via flow control valve 115. Alternatively, the latent heat of the argon condensation may be imparted to only a portion of kettle liquid stream wherein the remaining kettle liquid stream may be directed into the lower pressure column.

The argon condensing assembly 99 preferably comprises one or more once-through argon condenser cores and disposed at an intermediate location within the lower pressure column 54 where the argon-rich overhead vapor 95 from the partitioned section 92 of the divided wall argon rectification column arrangement 90 flows in a counter flow arrangement against sub-cooled and lower pressure kettle liquid or bottoms liquid 53 from the higher pressure column 52. The boil-up stream 112 from the argon condensing assembly 99 is a two phase (vapor/liquid) stream that is released into lower pressure column 54 for further rectification or separated in phase separator 114 into a vapor stream 116 and liquid stream 118 prior to being released or returned to the lower pressure column 54. The condensed, argon-rich liquid 98 is removed from a location proximate the bottom of the argon condensing assembly 99 and may be split into two portions. The main portion is fed to the top of the partitioned section 92 of the divided wall argon rectification column arrangement to provide reflux for the divided wall argon rectification column while the optional, second portion may be taken as a crude liquid argon product. A portion of the argon-rich overhead vapor 95 from the partitioned section 92 of divided wall argon rectification column arrangement can also be withdrawn as crude vapor argon product 97.

With the argon condenser 99 preferably disposed internal to the lower pressure column 54, there is the opportunity to use a portion of the down-flowing liquid within the lower pressure column 54 combined with kettle liquid 53 as the boiling side fluid in the argon condenser. However, it may be advantageous to use only kettle liquid directly here because the kettle liquid is normally higher in nitrogen, and thus provides a larger temperature difference in the internal argon condenser 99. However, persons skilled in the art will also recognize that alternate liquid streams such as a condensed air stream or a liquid nitrogen stream may be used in lieu of the crude liquid oxygen stream or the down flowing liquid as the source of refrigeration. Furthermore, the entire crude liquid oxygen stream could be fed into the lower pressure column and the internal argon condenser could be situated lower in the lower pressure column, but still immediately above the partitioned section 92 of the divided wall argon rectification column arrangement 90.

As described above, prior to entering the internally disposed argon condenser 99, the kettle liquid stream 53 is preferably subcooled within a subcooling heat exchangers 70B and 70A along with the reflux stream through indirect heat exchange with a nitrogen-rich vapor stream 57, 58 produced in the lower pressure column 54. The warmed nitrogen-rich vapor streams 67, 68 are then directed to the main heat exchanger 42 where it is further warmed to produce a gaseous nitrogen product stream 78 and a waste nitrogen stream 77.

Argon Rejection and Recovery

Employing the present divided wall argon rectification column arrangement and argon condensing assembly within the shell of the lower pressure column of a cryogenic air separation unit can enable power savings and may also serve to increase oxygen recovery within the cryogenic air separation unit. Preferably, an impure argon-rich stream withdrawn from the argon rectification column can be rejected or can be recovered by diverting all or a portion of the impure argon-rich stream to an adsorption based argon purification or refining subsystem 150. In some embodiments, discussed in more detail below, an impure argon-rich liquid stream can be withdrawn from the argon condensing assembly 99 disposed within the lower pressure column 54 and recovered by diverting a portion of the argon-rich liquid stream to an adsorption based argon purification or refining subsystem 150.

In the embodiment contemplating argon rejection shown in FIGS. 1 and 2, the impure argon-rich vapor stream 97 containing between about and 4% and 25% of oxygen impurities and up to about 1% nitrogen is withdrawn from the argon rectification column 56 and directed to the main heat exchanger 42 where the impure argon-rich stream 97 is warmed thereby providing a portion of the refrigeration for the air separation plant 10, allowing increased oxygen recovery. This particular arrangement is suitable for use in air separation plants having no specific argon product requirements.

In an embodiment contemplating high purity argon recovery shown in FIG. 5, an impure argon-rich stream 97 is withdrawn from the argon rectification column 56 and diverted to an adsorption based argon purification or refining subsystem 150. This particular arrangement is suitable for use in air separation plants having specific high purity argon product requirements. As seen in FIG. 5, the simplest way of purifying or refining the impure argon-rich stream 97 would be to compress the impure argon-rich stream 97 after it exits the warm end of the main heat exchanger 42. The warmed impure argon-rich stream 97 is then fed to an adsorption based argon purification or refining subsystem 150 such as the pressure swing adsorption (PSA) system shown in FIG. 6. The resulting purified argon vapor stream 170 is then delivered to a customer in gaseous form or liquefied and stored as high purity argon liquid in a storage vessel 160 from which liquid argon may be delivered to the customer, as needed.

Figure 8:
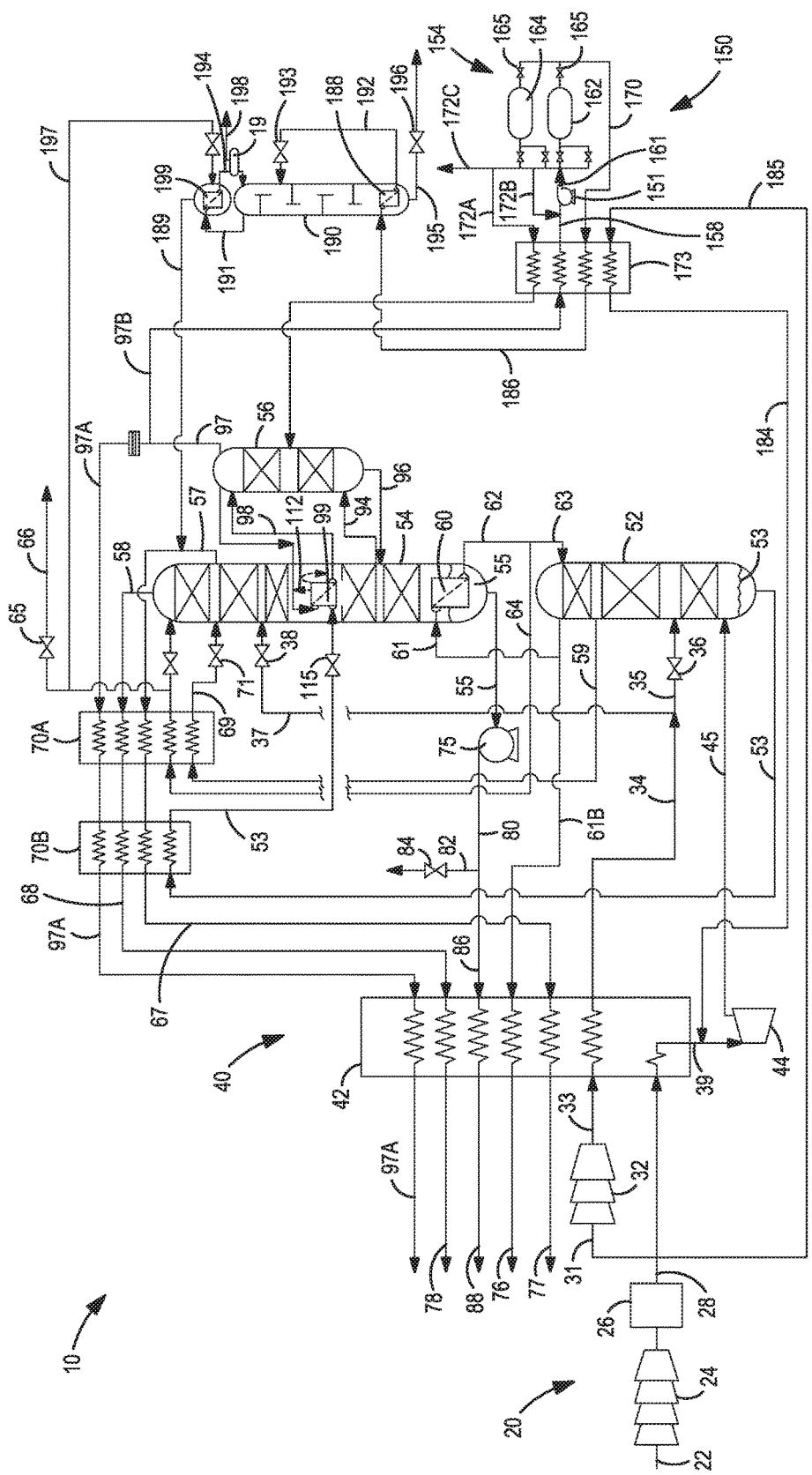
FIG. 8 is a schematic illustration of still another embodiment of an air separation plant having an air separation unit incorporating an argon rectification column and argon condensing assembly and further integrated with an argon recovery and purification system.
Figure 9:
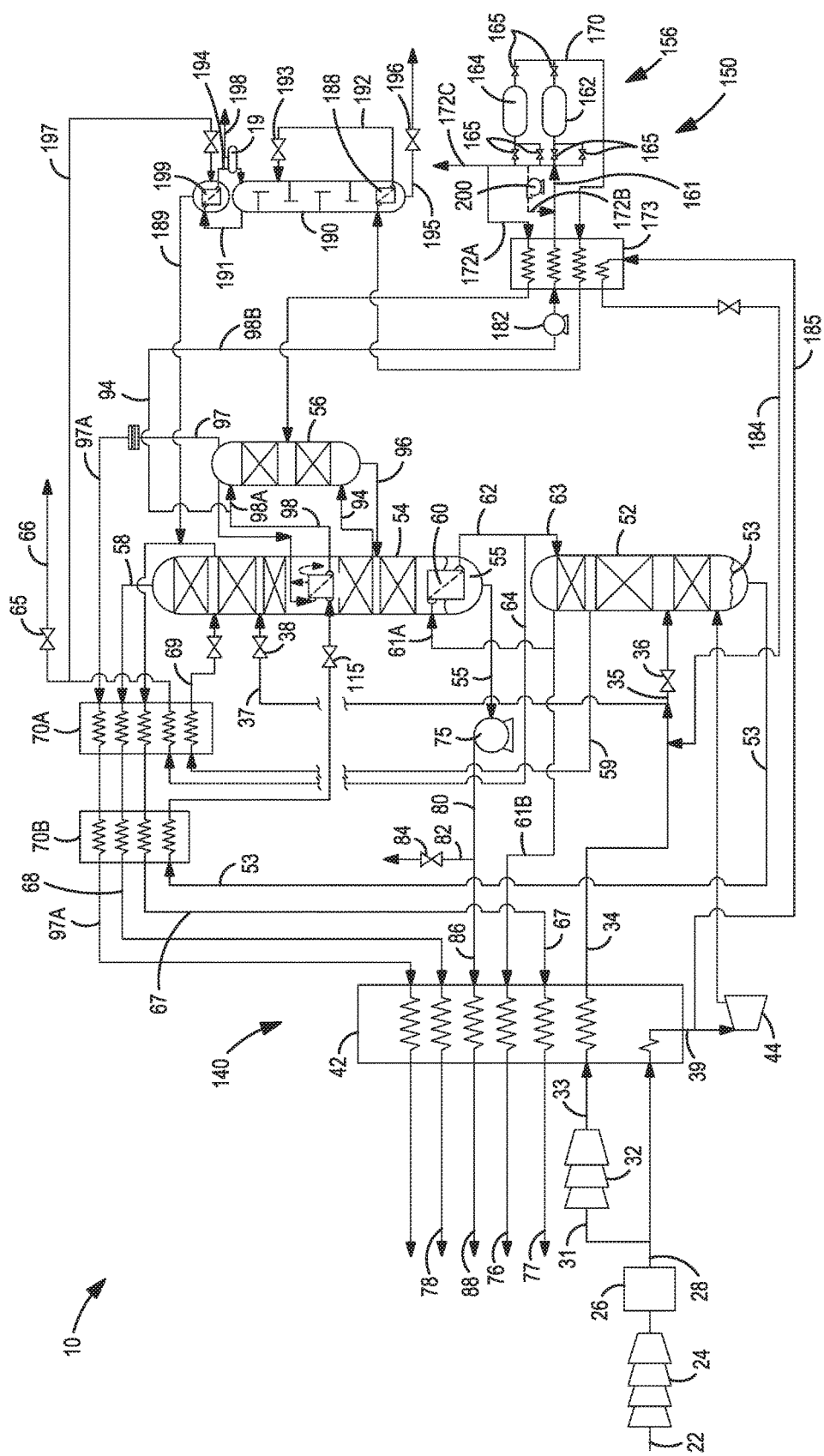
FIG. 9 is a schematic illustration of still another embodiment of an air separation plant having an air separation unit incorporating an argon rectification column and argon condensing assembly and further integrated with liquid based argon recovery and purification system.

Other embodiments contemplating argon recovery shown in FIGS. 7 and 8 takes the impure argon-rich stream 97B in gaseous form and directs it to an adsorption based argon purification or refining subsystem 150 comprising a separate argon recovery heat exchanger 152 and a recycling pressure swing adsorption (PSA) system 154. Alternatively, as shown in the embodiment of FIG. 9, it is possible to take a portion of argon-rich liquid stream 98B from the argon condensing assembly 99 internally disposed within the lower pressure column 54 as the impure argon-rich stream and direct it to an liquid phase adsorption based argon purification or refining subsystem 156.

Advantageously, since the key differences between the argon rejection arrangements and argon recovery arrangements lie outside the air separation unit coldbox, it becomes relatively easy and not overly capital intensive to change or retrofit the air separation plant from an argon rejection based plant to an argon recovery based plant, depending on the near-term argon product requirements. For example, the present arrangements for argon production would be particularly suitable for use in cryogenic air separation plants initially designed for argon rejection that can be easily modified to provide for argon recovery at a later date when the argon production requirements for the air separation plant change.

Argon Refining

In the embodiments employing argon recovery, the impure or crude argon-rich stream 97 in gaseous form is preferably introduced into argon refining and purification subsystem 150 having one or more adsorbent beds containing an adsorbent that is designed to remove oxygen impurities and optionally nitrogen impurities from the impure or crude argon-rich stream 97. Pressure elevation of the impure argon-rich stream 97 is accomplished with a compressor or pump 151. The adsorption of the impurities produces a purified argon stream that may be delivered as a purified argon vapor stream 170. Liquefaction of the purified argon vapor stream 170 produced from the PSA system is necessary for liquid argon production. As is well known in the art, the adsorption based argon refining or purification subsystems generally employ an alternating adsorption cycle having an on-line phase where the impure or crude argon-rich stream 97 is purified within one or more adsorbent beds and an off-line phase where the adsorbent contained in the adsorbent beds is regenerated through desorption of the previously adsorbed impurities.

One such adsorption based argon refining or purification subsystem is a cryogenic or liquid phase adsorption based argon refining or purification subsystem as generally described in U.S. patent application Ser. No. 14/192,003 filed on Feb. 27, 2014, the disclosure of which is incorporated by reference herein.

Another adsorption based argon refining or purification subsystem 150 is the non-cryogenic adsorption based argon refining or purification subsystem as shown generally in FIG. 6. As seen therein, a crude argon-rich stream 97 from distillation column system having about 4% to about 25% by volume oxygen and up to 1% by volume nitrogen impurities is passed through a small argon refining heat exchanger 152 to be warmed to temperature of about 200K to 300K, more preferably 250K to 300K, and most preferably 273K to 300K. This warmed crude argon gas stream 158 is then compressed in compressor 159 and the compressed argon stream 161 is passed to a PSA system comprising at least two adsorption vessels 162, 164 or beds and a plurality of valves 165 wherein the at least two adsorption vessels 162, 164 or beds are configured to remove the oxygen from the warmed, compressed crude argon gas stream 161 in a series of process steps comprising adsorption, equalization, blowdown, and pressurization.

The PSA system preferably is a carbon molecular sieve (CMS), a zeolite 4A, an ion-exchanged form of zeolite 4A or other kind of zeolite based adsorbent to remove the oxygen impurities. The typical adsorption pressure within the vessels during adsorption steps is in the range of about 80 psig to about 120 psig, and preferably between about 100 psig and 110 psig, and the temperature during the adsorption operation is near ambient temperatures. Removal of nitrogen can be accomplished within in the PSA system with the inclusion of a LiX layer in the adsorption beds. Alternatively, nitrogen impurities may be removed downstream of the PSA system using a high ratio column as a separate purifying step. In such alternate high ratio column embodiments (See FIG. 8), dirty shelf nitrogen vapor is preferably used to drive the high ratio column, although clean shelf vapor can be used to drive the high ratio column.

A crude argon compressor 159 is preferably included upstream of adsorption vessels 162, 164 to provide the warmed impure or crude argon-rich stream at the proper pressure required for the adsorption process. Alternatively, a liquid impure argon-rich stream may be pumped and vaporized. The gaseous argon product can be delivered as argon product, or liquefied and stored as a liquid argon product while the waste gas or blowdown gas 172 from the PSA system is preferably recycled. In the case of recycling, the waste gas or blowdown gas 172 from the PSA system may be recycled as stream 172A back to the argon rectification column 56 of the air separation plant 10 or as recycle stream 172B back to the feed of the PSA system. In some embodiments, the recycle stream 172C may be vented.

The embodiment of the adsorption based argon refining and purification subsystem shown in FIG. 6 has an estimated argon recovery of about 20%. Such modest argon recovery levels may be acceptable for many air separation plants, particularly where large gas only air separation plants are contemplated. As such modest argon recovery at low cost may be the best economic choice. Also, this may be more suitable in situations where the merchant argon market is not expected to develop until later. However, if a portion of the waste gas or blowdown gas 172 is recycled back to the feed of the PSA system, the argon recovery in the PSA system can be increased to about 60% or more. Enhanced recovery, however, will generally involve additional capital and operating costs such as the use of additional adsorption beds and multiple equalization steps to enable even higher argon recovery. The embodiment of the adsorption based argon refining and purification subsystem 150 of FIG. 6 may be incorporated within the air separation unit (ASU) schematics and flowsheets shown in FIGS. 5, 7, and 8.

In the embodiments illustrated in FIGS. 7 and 8, the impure or crude argon-rich vapor stream is routed to a separate, small argon recovery heat exchanger 152. A balancing warm stream 185, preferably an air stream, and a liquid nitrogen stream 59B are needed to make this heat exchange effective. These embodiments also contemplate recycling a portion of the waste gas or blowdown gas back to the argon rectification column via stream 172A, 180. Optionally, a portion of the waste gas or blowdown gas may be recycled as stream 172B back to the argon-rich feed of the PSA system 154.

In the embodiment of FIG. 7, after warming a gaseous impure or crude argon-rich stream 97B to about ambient temperature, the warmed crude argon-rich stream 158 is compressed or pumped via pump 151 or compressor 159 to feed the adsorption beds 162, 164. The preferred operating pressure is in the range of about 80 psig to about 120 psig, and preferably about 110 psig, Gas buffer tanks may be useful for this adsorption based argon refining and purification subsystem, but are not shown in FIG. 7. In order to enhance the overall argon recovery, a portion of the waste gas or blowdown gas 172A and 180 from the adsorbent beds can be returned to the argon rectification column 56. Since the operating pressure of the argon rectification column is low, return of the waste gas or blowdown gas requires little or no elevation of its pressure. While it is acceptable to return the waste gas to any location of the argon rectification column, the preferred return point can be proximate the upper half of the argon rectification column between the middle of the argon rectification column and the top of the argon rectification column. The recycle feed located near the middle of the argon rectification column is preferably at a location where there are a similar number of theoretical stages above this location and below this location. The overall argon recovery may also be increased by recycling a portion of the waste gas 172B and combining the recycled waste gas with crude argon feed 97B to the adsorption based system, upstream of the pump or compressor. Either or both of these argon recycle streams can be used to increase argon recovery, although the preferred arrangement recycles all or most of the waste gas or blowdown gas to the argon rejection column as stream 172A.

In FIG. 7, the adsorption beds preferably include a layer or layers of material such as LiX for essentially complete removal of the nitrogen contained in the warmed, compressed crude argon-rich stream 161. The purified gaseous argon product 170 exiting the adsorption beds 162, 164 is very pure, and it meets the specification for oxygen and nitrogen impurities in typical argon products (i.e. less than 1 ppm to 10 ppm oxygen, less than 1 ppm to 10 ppm nitrogen). The purified gaseous argon product 170 also remains at elevated pressure (e.g., about 75 psig to 115 psig). After withdrawal of the purified gaseous argon product 170 from the PSA system 154, it is passed into the argon recovery heat exchanger 152. Here it is cooled, condensed and subcooled against the crude argon-rich feed stream 97B and a portion of the dirty shelf liquid stream 59B from the higher pressure column 52. The subcooled, liquid argon 174 is then reduced in pressure via expansion valve 175 and passed to an argon product storage vessel. There is often a flow imbalance that occurs in the argon recovery heat exchanger 152, particularly when a portion of the waste gas or blowdown gas is vented to the atmosphere as stream 172C and not recycled as streams 172A and/or 172B. That is, the returning or recycle flow 172A in the argon recovery heat exchanger 152 may be lower than the flow of the warming streams. In order to satisfactorily warm the feed argon-rich stream 97B to near ambient temperature and to prevent excessive refrigeration loss, an optional air balance stream 185 is used. The optional air balance stream 185 is preferably a diverted portion of the compressed, purified feed air stream that is directed to the argon recovery heat exchanger 152 and returned as stream 184 to the air separation unit at a location upstream of turbine 44.

FIG. 8 differs from FIG. 7 in that there is little or no capability for removal of nitrogen impurity contained in the crude argon-rich feed 161 to the adsorbent beds 162, 164. Without a layer or layers of nitrogen removing adsorbent, a significant portion of nitrogen in the crude argon-rich feed 161 passes through the PSA system. For removal of nitrogen in this case, a high ratio argon column 190 is employed. The elevated pressure gaseous argon product 170 is cooled in the argon recovery heat exchanger 173 only to approximately its dew point. The vapor argon stream 186 is then fed to a reboiler 188 at the base of the high ratio argon column 190. Here the argon vapor stream 186 is condensed and withdrawn approximately at its saturated liquid state 192. The liquid stream 192 is reduced to column pressure through the feed valve 193 and fed at the appropriate location in the high ratio argon column 190. Nitrogen removal in the high ratio argon column 190 enables product grade argon 195 to be withdrawn at or near its base. The product grade argon liquid 195 through a control valve 196 prior to feed into an argon product storage vessel (not shown). Partial condensation of the nitrogen-rich overhead 191 in condenser 199 at the top of the high ratio argon column 190 can be accomplished by several cold liquid streams 197 which may include shelf liquid, dirty shelf liquid, oxygen-enriched liquid, or even liquid air. After vaporization of stream 197 in the condenser 199, the vaporized stream 189 is combined with the waste nitrogen stream 57 from the lower pressure column 54 before it is warmed in subcooler/heat exchangers 70B and 70A. The partially condensed nitrogen-rich stream 194 is phase separated in separator 19 with the liquid being returned to the high ratio column 190 as reflux and a small vapor stream 198 that contains the nitrogen impurity removed from the argon feed stream to the column is then vented to atmosphere.

An alternative method for enhanced nitrogen removal is via an argon pasteurization section disposed proximate the top of the argon rectification column. Interposed between the argon condensing assembly and the argon pasteurization section of the argon rectification column is a phase separator from which a small nitrogen-rich vent stream is exhausted, with the remaining crude argon liquid directed to the argon column pasteurization section as reflux for the argon rectification column. Although not shown, the argon rectification column in this embodiment includes a distillation section and a pasteurization section disposed immediately above the distillation section. A crude argon product stream or impure argon vapor stream is preferably removed from the argon rectification column near the top portion of the distillation section and below the pasteurization section while an overhead vapor stream is removed from the argon rectification column near the top portion of the pasteurization section and directed to the argon condensing assembly where it is partially condensed. With the argon pasteurizing section at the top of the argon rectification column, the nitrogen content of the overhead vapor stream from the argon rectification column directed to the argon condensing assembly is higher than the crude argon product stream removed from the top portion of the distillation section. All or a portion of the condensed crude argon liquid is then sent back to argon rectification column as reflux. The small amount of remaining overhead vapor that is not condensed is then removed as the nitrogen-rich vent stream from a downstream phase separator, thus enhancing the nitrogen removal.

For the configurations schematically illustrated in FIG. 7, the highest efficiency will be when the balancing air stream 185 is returned upstream of the lower column turbine 44. Alternatively, if the balancing air stream 185 is returned downstream of the turbine 44, but upstream of the higher pressure column 52, there is only a minor efficiency penalty. A larger efficiency penalty will be incurred if the balancing air stream 185 is fed into the lower pressure column 54 or combined with the waste nitrogen streams 57, 67, 77 from the air separation unit. A small portion of the dirty shelf liquid 59B is preferably withdrawn in FIGS. 7 and 8 valve expanded in valve 169 and used to fully condense and subcool the purified gaseous argon product 170 in a section of the argon recovery heat exchanger 152 with the vaporized shelf stream 181 exiting the argon recovery heat exchanger 152 being directed to and combined with the waste nitrogen stream 57. Alternatively, clean shelf liquid or another liquid nitrogen stream could be used to fully condense and subcool the argon product stream in the argon recovery heat exchanger.

The configuration of FIG. 9 differs from that of FIG. 8 in that the crude argon-rich stream is withdrawn from the argon rectification column as a liquid stream 98B rather than as a vapor stream. Specifically, in the embodiment of FIG. 9, a portion of the argon liquid return 98 from the argon condensing assembly 99 is diverted or withdrawn as the argon-rich liquid stream 98B. Alternatively, the argon rich liquid stream may be withdrawn directly from within the argon rectification column, at or near the top. A pump 182 raises the pressure of the crude argon rich liquid stream 98B to the desired pressure for the liquid based adsorption system 156. Alternatively, gravity head may provide sufficient pressure elevation without the need for a pump. After vaporization and warming in the argon recovery heat exchanger 173, the pressurized crude argon rich stream 161 is purified in the adsorbent beds 162, 164. In order to effectively vaporize and warm the crude argon-rich stream, an elevated pressure stream 185 must be introduced in the argon recovery heat exchanger 152. For most effective vaporization and warming of the crude argon-rich stream, a partially cooled stream is preferred. In FIG. 9, a minor portion of the intermediate temperature vapor air stream 185 upstream of the lower column turbine 44 is withdrawn and fed at the appropriate location in the argon recovery heat exchanger 173. This stream 185 is condensed and combined with the air stream 39 prior to feeding the higher pressure column 52 and the lower pressure column 54. The elevated pressure crude argon-rich liquid is preferably between about 95 psia and 135 psia. The intermediate temperature air stream is preferably between 225 psia and 325 psia. It is acceptable that the intermediate temperature air stream 185 exceeds this pressure range if the desired pressure stream is not available.

As an alternative to the withdrawal of a portion of the intermediate temperature air stream prior to turbine expansion, an intermediate temperature stream from the booster air compressor may be used. This alternative stream may be a portion of the stream delivered at the final discharge pressure of the booster air compressor, or it may be a stream withdrawn at an intermediate pressure from the booster air compressor. In the configuration of FIG. 9, adsorption materials such as LiX for nitrogen removal are not employed as the nitrogen removal is accomplished by means of the high ratio column 190. As in the FIG. 8 configuration, the purified gaseous argon product stream 170 is cooled to a near saturated vapor state in the argon recovery heat exchanger 152, and then fed to the reboiler 188 of the high ratio argon column 190. The configuration of the high ratio argon column 190 is similar to that described in FIG. 8. Likewise, preferably at least a portion of the low pressure waste stream 172C from the adsorbent beds is cooled and returned to the argon rectification column 56, similar to that of FIGS. 7 and 8. The configuration of FIG. 9 avoids the need for feed compression of the crude argon-rich stream prior to the adsorbent beds. Optionally, a portion of the waste from the adsorbent beds may be recycled as stream 172B back to the PSA system. To accomplish this, a compressor 200 is now required to elevate the pressure of the recycled waste stream 172B before it is combined with the warmed and vaporized crude argon-rich feed.

Figure 10:
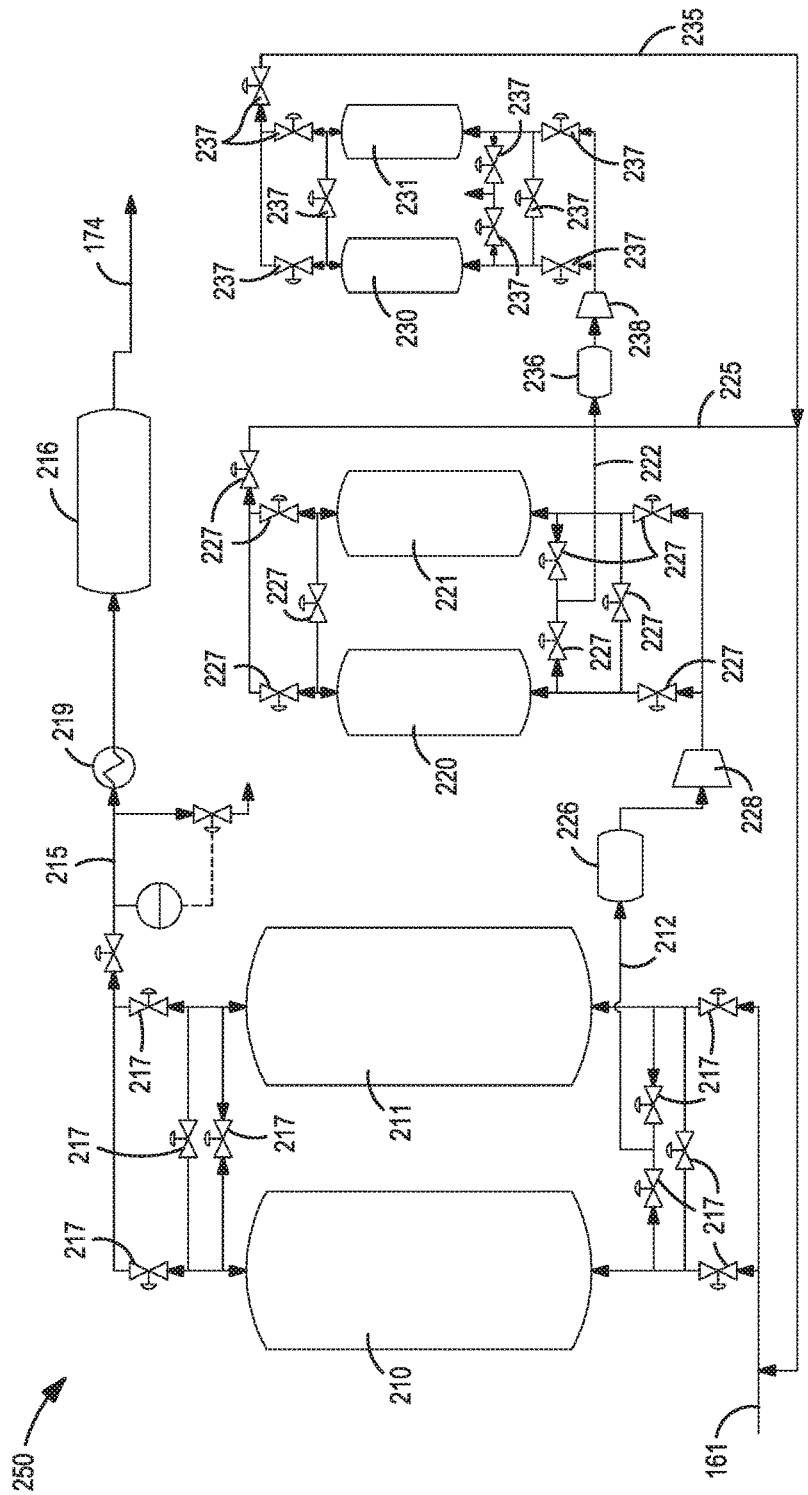
FIG. 10 is a schematic illustration of an alternate adsorption based argon refining and purification subsystem.

A still further embodiment of the adsorption based argon refining and purification subsystem is shown in FIG. 10. Advantageously, the embodiment of the adsorption based argon refining and purification subsystem 250 shown in FIG. 10 provides enhanced argon recovery with nominal increases in capital costs and operating costs. The disclosed embodiment employs a multi-stage PSA process with appropriately sized commercial adsorption beds 210, 211, 220, 221, 230, and 231 operating in series with a plurality of and control valves 217, 227, 237, tanks 216, 226, 236, heat exchanger 219 and compressors 228, 238 to increase overall argon recovery. In such embodiment, the blowdown or waste streams 212 and 222 of the upstream PSA stages are directed as argon-rich feed streams to one or more downstream PSA stages while the argon-enriched product streams 225 and 235 of the downstream PSA stages are recycled back to and combined with the crude argon-rich feed stream 161 to the first PSA stage. The systems and methods generally described herein with reference to FIG. 10 may enable the adsorption based argon refining and purification subsystem 250 to reach an argon recovery level of more than 70%, and preferably more than 85%.

Specifically, FIG. 10 illustrates a multi-stage adsorption based argon refining and purification subsystem 250 with three PSA stages, each stage comprising a 2-bed PSA system. The first PSA stage of the three-stage PSA system receives an impure or crude argon rejection stream 161 and produces a product grade argon stream 215 which may be further processes as product grade argon 174. The blowdown or waste stream 212 from the first 2-bed PSA stage is directed via tank 226 and compressor 228 to a second 2-bed PSA stage. The second 2-bed PSA stage is configured to take the argon from the blowdown or waste stream 212 of the first 2-bed PSA stage as an argon feed and enrich it to a low grade argon product stream having the same or similar argon concentration as the impure or crude argon rejection stream feed directed to the first 2-bed PSA stage. The size of the second 2-bed PSA stage is smaller than the first 2-bed PSA stage. The enriched low grade argon product stream 225 produced by the second 2-bed PSA stage is recycled back to and combined with the impure or crude argon stream 161 feed directed to the first 2-bed PSA stage.

Similarly, an optional third 2-bed PSA stage is configured to receive the blowdown or waste stream 222 of the second 2-bed PSA stage via tank 236 and compressor 238 and enriches it to form another low grade argon product stream 235 having the same or similar argon concentration as crude argon rejection stream feed 161. Again, the size of the third 2-bed PSA stage is smaller than both the first and second 2-bed PSA stages. The enriched low grade argon product stream 235 produced by the third 2-bed PSA stage is also recycled back to the crude argon rejection stream feed 161 directed to the first 2-bed PSA stage. Although FIG. 10 shows a three stage PSA system, additional stages may be added to further enhance the argon recovery to well above 90%.

EXAMPLES

Process modeling has shown that using an impure or crude argon-rich feed having a concentration of about 90% argon and about 10% oxygen impurities, a two stage PSA system could achieve argon recovery of 71% while a three stage PSA system shown in FIG. 10 could achieve argon recovery of 86%. An example is shown in Table 1 to illustrate the process metrics in a three stage PSA process.

TABLE 1

| Crude Argon-Rich Feed to PSA system at 90% Argon and 10% Oxygen Impurities | | | | | |
|---|---|---|---|---|---|
| | | | PSA-Stage 1 Production | PSA-Stage 2 Enrichment | PSA-Stage 3 Enrichment |
| Feed | Concentration | Ar % | 90 | 88 | 72 |
| | | $O_2$ % | 10 | 12 | 28 |
| | Flowrate | NCFH | 1.0 | 0.82 | 0.1 |
| Product | Concentration | Ar % | 99.9999 | 90 | 90 |
| | | $O_2$ % | 0.0001 | 10 | 10 |
| | Flowrate | NCFH | 0.18 | 0.72 | 0.05 |
| Waste | Concentration | Ar % | 88 | 72 | 55 |
| | | $O_2$ % | 12 | 28 | 45 |
| | Flowrate | NCFH | 0.82 | 0.1 | 0.05 |
| Process Argon Recovery | | % | 20 | 90 | 60 |

In the example highlighted in Table 1, the impure or crude argon-rich feed from the distillation column is 90% argon and 10% oxygen impurities. For easy demonstration, the impure or crude argon-rich feed flow is set at about 1.0 NCFH. As shown in Table 1, the process conditions such as concentrations and flowrates are calculated based on modeled argon process recovery for each of the three stages in the multi-stage, adsorption based argon refining and purification subsystem. The feed stream to PSA stage 2 is the waste stream from PSA stage 1 at a concentration of about 88% argon and 12% oxygen impurities. A compressor is required to compress this waste stream to the selected PSA system pressure of about 110 psig and a flowrate of about 0.82 NCFH. The compressed waste stream from the PSA stage 1 is directed to PSA stage 2. The enrichment product produced by the PSA stage 2 is about 90% argon and 10% oxygen impurities, the same as the impure or crude argon-rich feed to PSA stage 1. This low grade product stream from PSA stage 2 is at a flow rate of about 0.72 NCFH and is recycled back to and combined with the impure or crude argon-rich feed fresh crude feed to PSA stage 1.

When the optional stage 3 is used, the feed stream to PSA stage 3 is the waste stream from PSA stage 2 at a concentration of about 72% argon and 28% oxygen impurities and a flowrate of about 0.10 NCFH. As discussed in more detail below, this waste stream is further compressed using a compressor prior to entering PSA stage 3 beds. The argon enrichment product produced by PSA stage 3 is also about 90% argon and 10% oxygen impurities, the same as the impure or crude argon-rich feed to PSA stage 1. This low grade product stream from PSA stage 2 is at a flow rate of only about 0.05 NCFH and, like the waste stream from PSA stage 2 is recycled back to and combined with the impure or crude argon-rich feed fresh crude feed to PSA stage 1. It should be noted that the argon feed flow to PSA stage 1 in this example is constant at about 1.0 NCFH and the argon product flow from PSA stage 1 is fairly constant at about 0.18 NCFH. As a result, the recovery of argon for the overall process is increased to 86% for the three stage PSA system with the argon feed concentration at 90% argon and 10% oxygen impurities while the overall argon recovery for a two stage PSA system at these feed conditions is about 71%.

As indicated above, for the waste stream recycle process in a multi-stage PSA system described herein, one or more compressors 228, 238 may be required to compress the waste streams and feed the downstream adsorbent beds. Depending on the oxygen concentration in the waste stream, extra compressor cost may be incurred for this recycle process, particularly where the oxygen impurity concentration is greater than about 23.5%. To minimize capital costs and improve the safety characteristics of the present adsorption based argon refining and purification subsystem, it is desirable to avoid use of the higher cost compressors. As a result, it may be advantageous to design or configure the argon refining and purification process to keep the oxygen concentration in any waste stream requiting compression to a concentration of less than about 23.5%.

As shown in Table 1, the oxygen concentration in the waste stream from PSA stage 1 in the above example is only about 12%, so a standard compressor design is sufficient for this waste stream in the multi-stage PSA system and process. However, the waste stream from PSA stage 2 has an oxygen concentration of about 28%, which means a more expensive compressor may be needed if this waste stream is to be safely directed to PSA stage 3. Although additional stages of the multi-stage PSA system or arrangement will enable higher argon recoveries, the additional capital costs for additional stages may adversely impact the economics of the argon refining and purification process. In the present example shown in Table 1, the flow of waste stream from PSA stage 2 to PSA stage 3 is only about 10% of the impure or crude argon-rich feed flow to the multistage PSA system. Thus, it may be more economical to recycle this waste stream back to argon rectification column to recover argon.

Another example of the present multi-stage adsorption based argon refining and purification subsystem with three PSA stages, each stage comprising a 2-bed PSA system is provided in Table 2. This example shows the performance of multi-stage adsorption based argon refining and purification subsystem of FIG. 10 with a slightly lower argon concentration in the impure or crude argon-rich feed coming from argon rejection column, namely an argon concentration of about 85% and an oxygen impurity concentration of about 15%. As expected, the results shown in Table 2 indicate that the higher oxygen impurity concentration in the argon feed will generate higher oxygen concentrations in the waste streams. In this example, a two stage PSA with a standard normal air compressor still can be used for the waste stream recycle and still provide about 71% overall argon recovery whereas with a three stage PSA system the overall argon recovery remains at about 86%.

TABLE 2

Crude Argon-Rich Feed to PSA system at 85% Argon and 15% Oxygen Impurities

|  |  |  |  | PSA-Stage 1 Production | PSA-Stage 2 Enrichment | PSA-Stage 3 Enrichment |
|---|---|---|---|---|---|---|
| Feed | Concentration | Ar | % | 85 | 82 | 62 |
|  |  | O$_2$ | % | 15 | 18 | 38 |
|  | Flowrate |  | NCFH | 1.0 | 0.83 | 0.11 |
| Product | Concentration | Ar | % | 99.9999 | 85 | 85 |
|  |  | O$_2$ | % | 0.0001 | 15 | 15 |
|  | Flowrate |  | NCFH | 0.17 | 0.72 | 0.05 |
| Waste | Concentration | Ar | % | 82 | 62 | 44 |
|  |  | O$_2$ | % | 18 | 38 | 56 |
|  | Flowrate |  | NCFH | 0.83 | 0.11 | 0.06 |
| Process Argon Recovery |  |  | % | 20 | 90 | 60 |

The improved PSA system argon recoveries of the FIG. 10 configuration may allow satisfactory argon production without the need for further recycling. However, improved recovery PSA systems provide a large benefit in combination with recycling of the waste gas to the argon rectification column in order to enable even higher argon production. The higher characteristic recovery of the PSA system greatly reduces the flow of the recycling argon. That is, the return flow of the waste gas and the flow of the crude argon-rich product are reduced when the PSA system can achieve higher recovery. For example, a PSA system recovery of 60% will reduce these flows nominally by a factor of three compared to a PSA system recovery of 20% when all the waste gas is recycled to the argon rectification column. This provides significant advantage to the system. The lower flows greatly reduce the capital cost of the feed compressor and associated operating costs as a result of its lower power consumption. The lower flows also mean the adsorbent beds and the associated piping and valves may also be smaller and less expensive. The lower recycling flow further reduces the effect of the waste gas on the design of the argon rectification column and argon condenser.

While the present invention has been described with reference to a preferred embodiment or embodiments and operating methods associated therewith, it is understood that numerous additions, changes and omissions to the disclosed systems and methods can be made without departing from the spirit and scope of the present invention as set forth in the appended claims.

What is claimed is:

1. A method of producing a purified argon product stream in a cryogenic air separation unit, the method comprising the steps of:
   separating argon from an oxygen-argon containing stream within a lower pressure column of the cryogenic air separation unit using an argon rectification column arrangement disposed within the lower pressure column, the separation of the argon from the oxygen-argon containing stream producing an impure argon stream having between about and 4% and 25% of oxygen impurities;
   warming the impure argon stream via indirect heat exchange in an argon recovery heat exchanger against a purified argon stream from the pressure swing adsorption system, a waste gas stream from the pressure swing adsorption system, and against a balancing air stream of purified, compressed air from an incoming air purification and compression train or a main heat exchanger of the cryogenic air separation unit;
pressurizing the warmed impure argon stream; and
purifying the warmed, pressurized, impure argon stream by introducing the warmed, pressurized impure argon stream into a pressure swing adsorption system to produce the purified argon product stream and the waste gas stream;
wherein the impure argon stream is an impure gaseous argon stream diverted from an upper location of the argon rectification column arrangement disposed within the lower pressure column.

2. The method of claim 1, further comprising the steps of condensing and subcooling the purified argon product stream via indirect heat exchange with a liquid nitrogen stream from the cryogenic air separation unit to produce a purified liquid argon product stream.

3. The method of claim 1, further comprising the steps of removing nitrogen impurities from the purified argon product stream via a high ratio column to produce a nitrogen impurity free purified argon product stream.

4. The method of claim 1, further comprising the step of recycling the waste gas stream to the argon rectification column arrangement after exit from the argon recovery heat exchanger.

5. The method of claim 1, further comprising the step of combining or recycling the waste gas stream with the impure argon stream upstream of the pressure swing adsorption system after the impure argon stream exits from the argon recovery heat exchanger.

6. The method of claim 1, wherein the balancing air stream is returned to a location upstream of a lower column turbine system of the cryogenic air separation unit after warming the impure argon stream.

7. The method of claim 1, wherein the balancing air stream is returned to the higher pressure column of the cryogenic air separation unit after warming the impure argon stream.

8. The method of claim 7, wherein the balancing air stream is an elevated pressure stream that is withdrawn from an intermediate location of the main heat exchanger of the cryogenic air separation unit and introduced to the argon recovery heat exchanger where it warms the impure argon stream and then is returned to a location upstream of the higher pressure column of the cryogenic air separation unit as a liquid air stream.

9. An apparatus for producing a purified argon product comprising:
a cryogenic air separation unit having a higher pressure column and a lower pressure column, and an argon rectification column arrangement disposed within the lower pressure column, the cryogenic air separation unit configured to produce an impure argon stream having between about and 4% and 25% of oxygen impurities from an oxygen-argon containing stream introduced from the lower pressure column to the argon rectification column arrangement;
an argon recovery heat exchanger configured to warm the impure argon stream to a temperature between about 200K and 300K against a stream of the purified argon stream from the pressure swing adsorption system, a waste gas stream from the pressure swing adsorption system, and a balancing air stream of purified, compressed air of the cryogenic air separation unit;
an argon compressor or pump configured for pressurizing the impure argon stream;
a pressure swing adsorption system configured for purifying the pressurized impure argon stream, the pressure swing adsorption system comprising an adsorbent bed having an adsorbent configured for adsorbing the oxygen impurities to produce the purified argon stream and the waste gas stream.

10. The apparatus of claim 9, further comprising an argon condensing assembly disposed within the lower pressure column at a location above the argon rectification column arrangement and wherein the impure argon stream is an impure gaseous argon stream diverted from an upper location of the argon rectification column arrangement or upstream of an argon condensing assembly.

11. The apparatus of claim 9 further comprising a recycle conduit disposed between the pressure swing adsorption system and the argon rectification column arrangement configured for recycling the waste gas stream to the argon rectification column arrangement disposed within the lower pressure column after exit from the argon recovery heat exchanger.

12. The apparatus of claim 9, further comprising a recycle conduit disposed between the pressure swing adsorption system and the argon rectification column arrangement and configured for recycling the waste gas stream and combining the recycled waste gas with the impure argon stream upstream of the pressure swing adsorption system after the impure argon stream exits from the argon recovery heat exchanger.

13. The apparatus of claim 10, further comprising a warm air balancing circuit configured to supply the balancing air stream from an incoming air purification and compression train of the cryogenic air separation unit to the heat exchanger argon recovery where it warms the impure argon stream and return the balancing air stream to a location upstream of a lower column turbine system of the cryogenic air separation unit.

14. The apparatus of claim 10, further comprising a warm air balancing circuit configured to supply the balancing air stream from an incoming air purification and compression train of the cryogenic air separation unit to the heat exchanger argon recovery where it warms the impure argon stream and return the balancing air stream to the higher pressure column of the cryogenic air separation unit.

15. A method of producing a purified argon product stream in a cryogenic air separation unit, the method comprising the steps of:
separating argon from an oxygen-argon containing stream within a lower pressure column of the cryogenic air separation unit using an argon rectification column arrangement disposed within the lower pressure column, the separation of the argon from the oxygen-argon containing stream producing an impure argon stream having between about and 4% and 25% of oxygen impurities;
warming the impure argon stream against the purified argon product stream and against a balancing air stream of purified, compressed air;
pressurizing the warm impure argon stream; and
purifying the warm, pressurized, impure argon stream by introducing the warm, pressurized impure argon stream into a pressure swing adsorption system to produce the purified argon product stream and a waste gas stream wherein the balancing air stream is returned to a location upstream of a lower column turbine system of the cryogenic air separation unit after warming the impure argon stream.

16. The method of claim 15, further comprising the steps of removing nitrogen impurities from the purified argon product stream via a high ratio column to produce a nitrogen impurity free purified argon product stream.

17. The method of claim 15, wherein an argon condensing assembly is disposed within the lower pressure column at a location above the argon rectification column and wherein the impure argon stream is an impure liquid argon stream diverted from the argon condensing assembly or a location downstream of the argon condensing assembly.

18. The method of claim 15, wherein the impure argon stream is an impure gaseous argon stream diverted from an upper location of the argon rectification column arrangement disposed within the lower pressure column.

19. The method of claim 15, further comprising the step of recycling the waste gas stream from the pressure swing adsorption system to the argon rectification column arrangement.

20. The method of claim 15, further comprising the step of recycling the waste gas stream from the pressure swing adsorption system and combining the waste gas stream with the impure argon stream upstream of the pressure swing adsorption system.

21. The method of claim 15, wherein after warming the impure argon stream the cooled balancing air stream is combined with a feed air stream that is directed to the higher pressure column of the cryogenic air separation unit.

22. The method of claim 15, wherein after warming the impure argon stream the cooled balancing air stream is a liquid air stream that is directed to the higher pressure column of the cryogenic air separation unit.

23. An apparatus for producing a purified argon product comprising:
  a cryogenic air separation unit having a higher pressure column and a lower pressure column, and an argon rectification column arrangement disposed within the lower pressure column, the cryogenic air separation unit configured to produce an impure argon stream having between about and 4% and 25% of oxygen impurities from an oxygen-argon containing stream introduced from the lower pressure column to the argon rectification column arrangement;
  an argon condensing assembly disposed within the lower pressure column at a location above the argon rectification column arrangement and wherein the impure argon stream is an impure liquid argon stream diverted from the argon condensing assembly or a location downstream of the argon condensing assembly;
  a pump for pumping the impure liquid argon stream;
  an argon recovery heat exchanger configured to warm the pumped impure liquid argon stream to a temperature between about 200K and 300K against a purified argon stream and a balancing air stream from an incoming air purification and compression train of the cryogenic air separation unit;
  a pressure swing adsorption system configured for purifying the impure liquid argon stream, the pressure swing adsorption system comprising an adsorbent bed having an adsorbent configured for adsorbing the oxygen impurities to produce the purified argon stream and a waste gas stream;
  an air balancing circuit configured to supply the balancing air stream from a location upstream of a lower column turbine system of the cryogenic air separation unit to the argon recovery heat exchanger where it warms the impure liquid argon stream and the air balancing circuit is further configured to return the balancing air stream as a liquid air stream to the higher pressure column.

24. The apparatus of claim 23, wherein the argon recovery heat exchanger is configured to warm the impure argon stream against the purified argon stream from the pressure swing adsorption system, the waste gas stream from the pressure swing adsorption system, and the balancing air stream of purified, compressed air from the incoming air purification and compression train of the cryogenic air separation unit.

25. The apparatus of claim 24 further comprising a recycle conduit disposed between the pressure swing adsorption system and the argon rectification column arrangement and configured for recycling the waste gas stream to the argon rectification column arrangement disposed within the lower pressure column after exit from the argon recovery heat exchanger.

26. The apparatus of claim 24, further comprising a recycle conduit disposed between the pressure swing adsorption system and the argon rectification column arrangement and configured for recycling the waste gas stream and combining the recycled waste gas with the impure argon stream upstream of the pressure swing adsorption system after the impure argon stream exits from the argon recovery heat exchanger.

27. An apparatus for producing a purified argon product comprising:
  a cryogenic air separation unit having a higher pressure column and a lower pressure column, and an argon rectification column arrangement disposed within the lower pressure column, the cryogenic air separation unit configured to produce an impure argon stream having between about and 4% and 25% of oxygen impurities from an oxygen-argon containing stream introduced from the lower pressure column to the argon rectification column arrangement;
  an argon recovery heat exchanger configured to warm the impure argon stream to a temperature between about 200K and 300K against a purified argon stream and a balancing air stream from an incoming air purification and compression train of the cryogenic air separation unit;
  an argon compressor or pump configured for pressurizing the impure argon stream;
  a pressure swing adsorption system configured for purifying the impure argon stream, the pressure swing adsorption system comprising an adsorbent bed having an adsorbent configured for adsorbing the oxygen impurities to produce the purified argon stream and a waste gas stream; and
  a recycle conduit disposed between the pressure swing adsorption system and the argon rectification column arrangement and configured for recycling the waste gas stream from the pressure swing adsorption system and combining the recycled waste gas with the impure argon stream upstream of the pressure swing adsorption system.

28. The apparatus of claim 27, wherein the argon recovery heat exchanger is configured to warm the impure argon stream against the purified argon stream from the pressure swing adsorption system, the waste gas stream from the pressure swing adsorption system, and the balancing air stream of purified, compressed air from the incoming air purification and compression train of the cryogenic air separation unit.

29. The apparatus of claim 27, further comprising an argon condensing assembly disposed within the lower pressure column at a location above the argon rectification column arrangement and wherein the impure argon stream is an impure gaseous argon stream diverted from an upper location of the argon rectification column arrangement or upstream of the argon condensing assembly.

30. The apparatus of claim 27, further comprising an air balancing circuit configured to supply the balancing air stream from the incoming air purification and compression train of the cryogenic air separation unit to the argon recovery heat exchanger where it warms the impure argon stream and the air balancing circuit is further configured to return the balancing air stream to a location upstream of a lower column turbine system of the cryogenic air separation unit.

31. The apparatus of claim 27, further comprising an air balancing circuit configured to supply a balancing air stream from the incoming air purification and compression train of the cryogenic air separation unit to the argon recovery heat exchanger where it warms the impure argon stream and the air balancing circuit is further configured to return the balancing air stream to the higher pressure column of the cryogenic air separation unit.

32. An apparatus for producing a purified argon product comprising:
- a cryogenic air separation unit having a higher pressure column and a lower pressure column, and an argon rectification column arrangement disposed within the lower pressure column, the cryogenic air separation unit configured to produce an impure argon stream having between about and 4% and 25% of oxygen impurities from an oxygen-argon containing stream introduced from the lower pressure column to the argon rectification column arrangement;
- wherein the impure argon stream is an impure gaseous argon stream diverted from an upper location of the argon rectification column arrangement or upstream of an argon condensing assembly;
- an argon compressor or pump configured for pressurizing the impure argon stream;
- an argon recovery heat exchanger configured to warm the impure argon stream to a temperature between about 200K and 300K against a purified argon stream and a balancing air stream from an incoming air purification and compression train of the cryogenic air separation unit;
- a pressure swing adsorption system configured for purifying the warmed, pressurized impure argon stream, the pressure swing adsorption system comprising an adsorbent bed having an adsorbent configured for adsorbing the oxygen impurities to produce the purified argon stream and a waste gas stream; and
- a warm air balancing circuit configured to supply the balancing air stream from the incoming air purification and compression train of the cryogenic air separation unit to the argon recovery heat exchanger where it warms the impure argon stream and the air balancing circuit is further configured to return the balancing air stream to a location upstream of a lower column turbine system of the cryogenic air separation unit.

33. The apparatus of claim 32, wherein the argon recovery heat exchanger is configured to warm the impure argon stream against the purified argon stream from the pressure swing adsorption system, the waste gas stream from the pressure swing adsorption system, and the balancing air stream of purified, compressed air from the incoming air purification and compression train of the cryogenic air separation unit.

34. The apparatus of claim 32, further comprising a recycle conduit disposed between the pressure swing adsorption system the argon rectification column arrangement and configured for recycling the waste gas stream to the argon rectification column arrangement disposed within the lower pressure column after exit from the argon recovery heat exchanger.

35. The apparatus of claim 32, further comprising a recycle conduit disposed between the pressure swing adsorption system the argon rectification column arrangement and configured for recycling the waste gas stream and combining the recycled waste gas with the impure argon stream upstream of the pressure swing adsorption system after the impure argon stream exits from the argon recovery heat exchanger.

* * * * *